(12) United States Patent
Shin et al.

(10) Patent No.: US 12,511,807 B2
(45) Date of Patent: Dec. 30, 2025

(54) GENERATING TEXTURE IMAGE FOR VIRTUAL OBJECT FROM CAPTURED IMAGE

(71) Applicant: CLO VIRTUAL FASHION INC., Seoul (KR)

(72) Inventors: Hyun Joon Shin, Suwon-si (KR); Myung Hyun Yang, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 276 days.

(21) Appl. No.: 18/295,834

(22) Filed: Apr. 4, 2023

(65) Prior Publication Data

US 2023/0245367 A1     Aug. 3, 2023

Related U.S. Application Data

(63) Continuation-in-part of application No. PCT/KR2022/009747, filed on Jul. 6, 2022.

(30) Foreign Application Priority Data

Jul. 7, 2021   (KR) .................. 10-2021-0088927
Jul. 5, 2022   (KR) .................. 10-2022-0082625

(51) Int. Cl.
*G06T 15/04*     (2011.01)
*G06T 7/187*     (2017.01)
*G06T 13/40*     (2011.01)

(52) U.S. Cl.
CPC .............. *G06T 13/40* (2013.01); *G06T 7/187* (2017.01); *G06T 15/04* (2013.01);
(Continued)

(58) Field of Classification Search
CPC ......... G06T 13/40; G06T 7/187; G06T 15/04; G06T 2207/20104; G06T 2210/16
See application file for complete search history.

(56) References Cited

U.S. PATENT DOCUMENTS

2019/0388182 A1* 12/2019 Kumar ................. G06T 7/33
2021/0074057 A1*  3/2021 Gammelmark .......... G06T 7/40

FOREIGN PATENT DOCUMENTS

CN     110807494 A     2/2020
CN     112131724 A    12/2020
(Continued)

OTHER PUBLICATIONS

Matusik et al. Texture design using a simplicial complex of morphable textures. ACM Trans. Graph. 24, 3 (Jul. 2005), 787-794. https://doi.org/10.1145/1073204. (Year: 2005).*
(Continued)

*Primary Examiner* — Antonio A Caschera
(74) *Attorney, Agent, or Firm* — WTA IP Law P.C.

(57) ABSTRACT

Generating a texture image of a virtual fabric from a captured image involves generating similarity information about each similarity between a basic pattern included in a target analysis area and a plurality of sub areas which divide the target analysis area. At least one of information about a repetition number of the basic pattern and information about a repetition direction of the basic pattern is generated based on the similarity information. A texture image of a virtual fabric is generated by disposing a plurality of basic patterns in a predetermined area based on the basic pattern, the information about the repetition number and the information about the repetition direction.

20 Claims, 16 Drawing Sheets

(52) U.S. Cl.
CPC ............ *G06T 2207/10024* (2013.01); *G06T 2207/20104* (2013.01); *G06T 2210/16* (2013.01)

(56) References Cited

FOREIGN PATENT DOCUMENTS

| | | | | |
|---|---|---|---|---|
| GB | 2530103 A | * | 3/2016 | ............ G06T 15/00 |
| KR | 10-1806840 B1 | | 12/2017 | |
| KR | 10-2018-0023066 A | | 3/2018 | |
| KR | 10-2019-0037636 A | | 4/2019 | |
| TW | 200701899 A | | 1/2007 | |

OTHER PUBLICATIONS

Min-Soo Kim et al. "A Realistic Modeling and Rendering of Cloth Textures by Photometry" Journal of Korea Institute of Information Scientists and Engineers(KIISE): System and Theory, vol. 35, No. 2 (Feb. 2008) pp. 84-93, South Korea (With Abstract).

Ju-Ri Kim et al. "A study of Design and Simulation for 3Dimentsion Fashion" The Korea Society of Computer and information Summer Conference vol. 18, No. 2 (Jul. 2010) pp. 23-26, South Korea (With Abstract).

PCT International Search Report of PCT/KR2022/009747 mailed Sep. 29, 2022 by Korea Patent Office.

Niklas Peinecke et al: "Generating Tactile Textures using Periodicity Analysis", Cyberworlds, 2007. CW 1 07. International Conference on, IEEE, Piscataway, NJ, USA, Oct. 1, 2007 (Oct. 1, 2007), pp. 308-313, XP031185850, ISBN: 978-0-7695-3005-5.

Kolar Martin: "High Quality Texture Synthesis", Ph.D. thesis, Sep. 1, 2016 (Sep. 1, 2016), pp. 1-163, XP055850327, Retrieved from the Internet: URL:http:/wrap.warwick.ac.uk/135008/1/WRAP_Theses_Kolar_2016.pdf [retrieved on Oct. 12, 2021].

Linh et al: "Extracting periodicity of a 1-20 regular texture based on autocorrelation functions", Pattern Recognition Letters, Elsevier, Amsterdam, NL, vol. 18, No. 5, May 1, 1997 (May 1, 1997), pp. 433-443, XP004084798, ISSN: 0167-8655, DOI: 10.1016/S0167-8655(97)00030-5.

Junwei Han et al: "Regular Texture Analysis as Statistical Model Selection", Oct. 12, 2008 (Oct. 12, 2008), Oct. 12, 2008, pp. 242-255, XP019109319.

Extended European Search Report of EP 22837966.5 mailed on Jul. 23, 2024.

* cited by examiner

GENERATING TEXTURE IMAGE FOR VIRTUAL OBJECT FROM CAPTURED IMAGE

CROSS-REFERENCE TO RELATED APPLICATIONS

This is a bypass continuation of International PCT Patent Application No. PCT/KR2022/009747 filed on Jul. 6, 2022, which claims priority to Republic of Korea Patent Application No. 10-2021-0088927, filed on Jul. 7, 2021, and Republic of Korea Patent Application No. 10-2022-0082625, filed on Jul. 5, 2022, which are incorporated herein by reference in their entirety for all purposes.

BACKGROUND

1. Field of the Invention

The disclosure relates to generating a texture image for a virtual object from a captured image.

2. Description of the Related Art

A fabric manufactured by a weaving method may have a regular pattern. In general, a pattern of the fabric is extracted manually by a person, and the texture of the fabric may be synthesized from the extracted pattern. In order to use an actual fabric in a virtual simulation, the fabric may need to be produced in a form of a texture. However, many repetitive operations are performed to generate the texture. Therefore, virtual simulation of various actual fabrics may require a lot of time and human resources.

The virtual fabric used for garment simulation may be composed of a part (e.g., a mesh) for expressing physical properties and a part for expressing visual properties such as texture. A texture may be composed of a part for expressing the color of the fabric and a normal map for expressing unevenness or roughness of its surfaces.

SUMMARY

Embodiments relate to generating a texture image of a virtual fabric. Similarity information associated with similarity between a pattern in a portion of an input image and a plurality of sub areas in the portion is generated. At least one of a number of times the pattern is repeated in the portion of the input image or a direction in which of the pattern is repeated in the portion of the input image is determined based on the similarity information. A texture image of a virtual fabric is generated by repeating the pattern in at least a predetermined area of the image based on the pattern, the number of times the pattern is repeated, and the direction in which the pattern is repeated.

In one or more embodiments, the portion of the input image comprises an area selected by a user input.

In one or more embodiments, the portion of the input image has a size that is greater than a size of the area selected by the user input.

In one or more embodiments, correcting the texture image is corrected based on at least one of pattern correction information, overlapping area information and brightness correction information.

In one or more embodiments, the selected area includes the pattern.

In one or more embodiments, the input image includes at least one of a color image or a normal image. The similarity information is determined based on at least one of first similarity information indicative of similarity between the pattern and the plurality of sub areas in the color image, and second similarity information is indicative of similarity between the pattern and the plurality of sub areas in the normal image.

In one or more embodiments, the similarity information is determined as a weighted sum of the first similarity information and the second similarity information.

In one or more embodiments, the information about the repetition number includes a number of sub areas that is similar to the pattern with a degree greater than or equal to predetermined criteria.

In one or more embodiments, the information about the repetition direction includes direction-related information which is determined based on a distributed direction of sub areas similar to the pattern with a degree greater than or equal to predetermined criteria.

In one or more embodiments, the information about the repetition direction includes a first direction in which sub areas similar to the pattern with a degree greater than or equal to predetermined criteria are distributed and a second direction in which sub areas similar to the pattern with a degree greater than or equal to predetermined criteria are distributed based on a location of the pattern.

In one or more embodiments, the texture image is generated by determining a location of the pattern, determining a first direction and a second direction based on the location of the pattern and the information about the repetition direction, determining a first repetition number of a plurality of sub areas distributed in the first direction and a second repetition number of a plurality of sub areas distributed in the second direction based on the information about the repetition number and the information about the repetition direction; and generating the texture image by arranging the pattern repeatedly based on the first direction, the second direction, the first repetition number, and the second repetition number.

In one or more embodiments, at least one of the information about the repetition number and the information about the repetition direction is determined by removing noise by blurring the similarity information, extracting an area having a similarity greater than or equal to a threshold value based on a blurred version of the similarity information, converting similarity information of the extracted area greater than or equal to the threshold value using a frequency domain transform, and obtaining at least one of the information about the repetition number and the information about the repetition direction based on the converted similarity information.

In one or more embodiments, the texture image is corrected based on the pattern correction information by applying a homography function on the texture image so that an angle between a first direction and a second direction becomes perpendicular, aligning a plurality of basic patterns disposed in the generated texture image based on the first direction and the second direction, correcting a first reference line to a straight line so that the first reference line becomes vertical relative to the second direction when the first reference line following the first direction is curved, and correcting a second reference line to a straight line so that the second reference line becomes vertical relative to the first direction when the second reference line following the second direction is curved.

In one or more embodiments, the texture image is corrected based on the overlapping area information by dividing the texture image into a plurality of patches, rearranging the plurality of patches, determining presence of a discontinuous pattern area in an area where the plurality of rearranged patches contact each other, determining an overlapping area of the plurality of patches based on presence of the discontinuous pattern area, and overlapping the plurality of patches based on the overlapping area.

In one or more embodiments, the plurality of patches are smoothed using a multi-band blending scheme.

In one or more embodiments, the texture image is corrected based on the brightness correction information by correcting a brightness of the pattern that is repeated based on the brightness correction information to resolve inconsistency of a brightness between the plurality of basic patterns included in the texture image.

In one or more embodiments, a simulation result of clothing a three-dimensional (3D) avatar with a 3D garment incorporating the texture image is outputted.

In one or more embodiments, a user input related to controlling a size of the texture image is received. The size of the texture image expressed on a 3D garment is modified according to the user input for the texture image.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
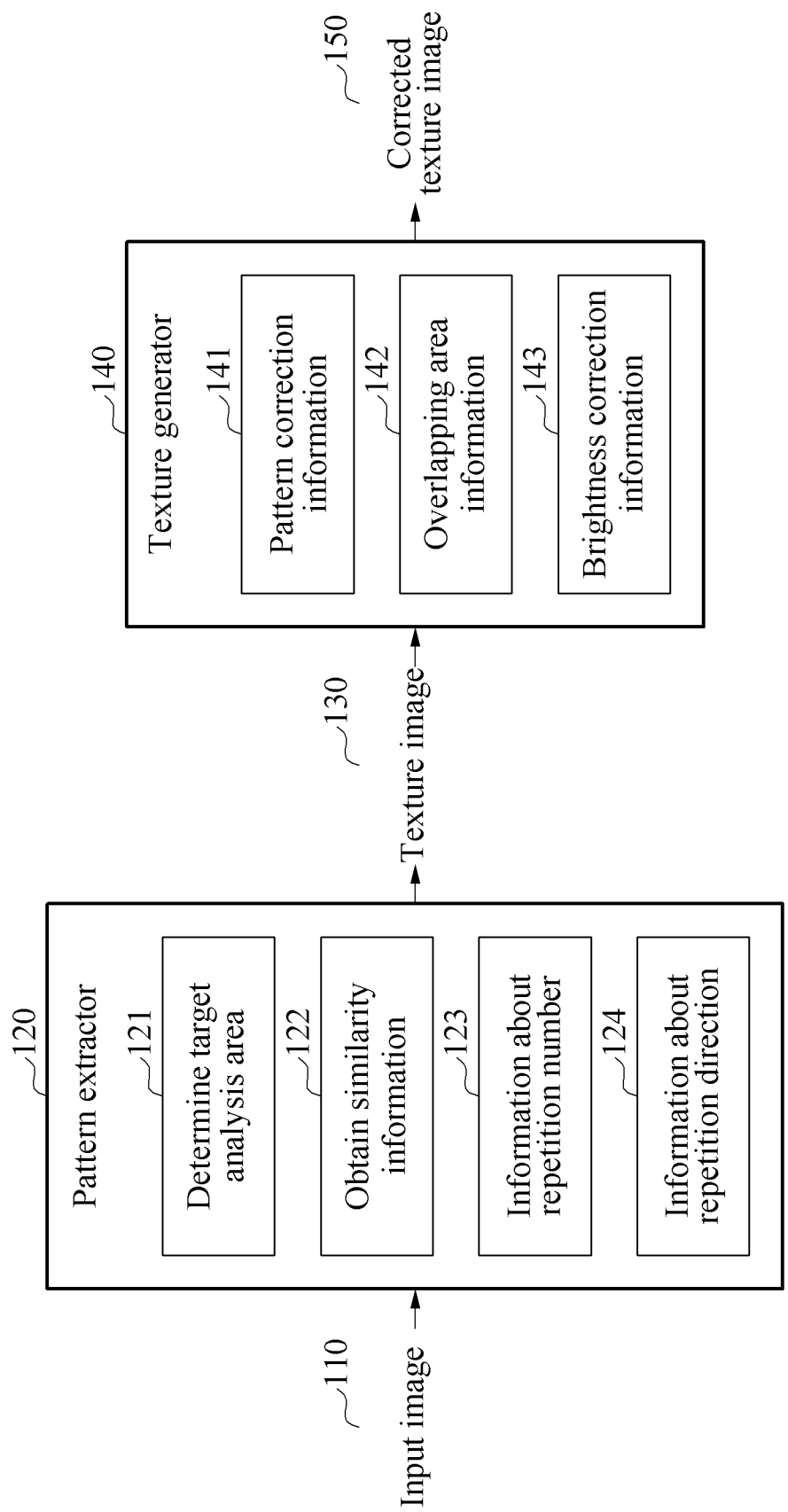
FIG. 1 is a diagram illustrating a method of generating a texture image, according to an example embodiment.

The following structural or functional descriptions are examples to merely describe embodiments, and the scope of the example embodiments is not limited to the descriptions provided in the present specification.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more of other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. In the drawings, like reference numerals are used for like elements.

FIG. 1 is a diagram illustrating a method of generating a texture image according to an example embodiment. The present disclosure may include a method of reflecting a visual characteristic of an actual fabric in a virtual fabric realistically and efficiently as part of the process of converting the actual fabric into the virtual fabric.

In order to apply a visual characteristic of an actual fabric to a virtual fabric, a precise texture image may be obtained by a specialized scanner such as VIZOO. However, it may be difficult to use such devices in a commercial setting due to their size and cost. Also, the size of the actual fabric to be scanned by such specialized scanner may be large (e.g., 1 yard or more).

Embodiments relate to enabling scanning of the actual fabric using a small device. Further, embodiments enable generation of a realistic virtual fabric with a scanned image of actual fabric that is relatively small in size.

Hereinafter, a method of generating a texture image of a virtual fabric will be described in detail.

A processor 1210 according to an example embodiment may analyze and extract a pattern which repeatedly appears in the scanned image of the fabric. The processor 1210 according to an example embodiment may synthesize the extracted pattern to generate a texture image, and correct the generated texture image. The processor 1210 may thereby generate a texture image applied with the visual characteristic of the fabric. Hereinafter, a method of generating and correcting a texture image will be described in detail.

FIG. 1 shows an input image 110, a pattern extractor 120, determination 121 of a target analysis area, obtaining 122 of similarity information, information 123 about a repetition number, information 124 about a repetition direction, a texture image 130, a texture generator 140, pattern correction information 141, overlapping area information 142, brightness correction information 143, and a corrected texture image 150.

The input image 110 according to an example embodiment may be an image including the fabric. The input image 110 may include a color image and/or a normal image. A fabric may be raw material for fabricating clothing. The input image 110 may include an image obtained from an image acquisition device. The image acquisition device may be any device which can obtain an image including a fabric. The image acquisition device may include devices such as a camera and a scanner but is not limited thereto.

The pattern extractor 120 according to an example embodiment may include a module for extracting a pattern from the input image 110. In the present disclosure, a pattern may be a visual characteristic that repeats in the fabric. The processor 1210 may extract a pattern from the input image 110 using the pattern extractor 120. The processor 1210 may generate the texture image 130 from the input image 110 using the pattern extractor 120.

The pattern extractor 120 according to an example embodiment may determine 121 a target analysis area. The target analysis area 210 is described with reference to FIG. 2, and refers to a region of the input image 110 that has a size that is multiple times of a selected area 230 selected by a user and encompasses selected area. In one embodiment, the selected area 230 may be placed at the center of the target analysis area 210. The processor 1210 may determine the selected area 230 in the input image 110 based on information received from a user. The information received from the user may include information related to the area selected by the user. The user may select the area for pattern extraction from the input image.

The processor 1210 may determine the selected area 230 followed by determining of the target analysis area 210 from the input image 110 based on the selected area 230. For example, when the selected area 230 is determined, the processor 1210 may determine the target analysis area 210 having a size that is multiple time (e.g., 4 times) larger than the selected area. The processor 1210 may determine the basic pattern area 250 from the selected area 230 and/or the target analysis area 210. The basic pattern area 250 refers to an area that includes a unit pattern used for generating a texture image. The processor 1210 may duplicate and repeat the basic pattern area 250 to generate a texture image.

After the basic pattern area 250 is determined, the processor 1210 may calculate the similarity information indicating similarity between the basic pattern area 250 and at least some part of the target analysis area 210 to analyze the degree of repetition of the basic pattern area 250 in the target analysis area 210. Therefore, the processor 1210 may analyze the degree of repetition of the basic pattern area 250 and the direction of such repetition in the target analysis area 210, and thereby analyze the general pattern.

Figure 3:
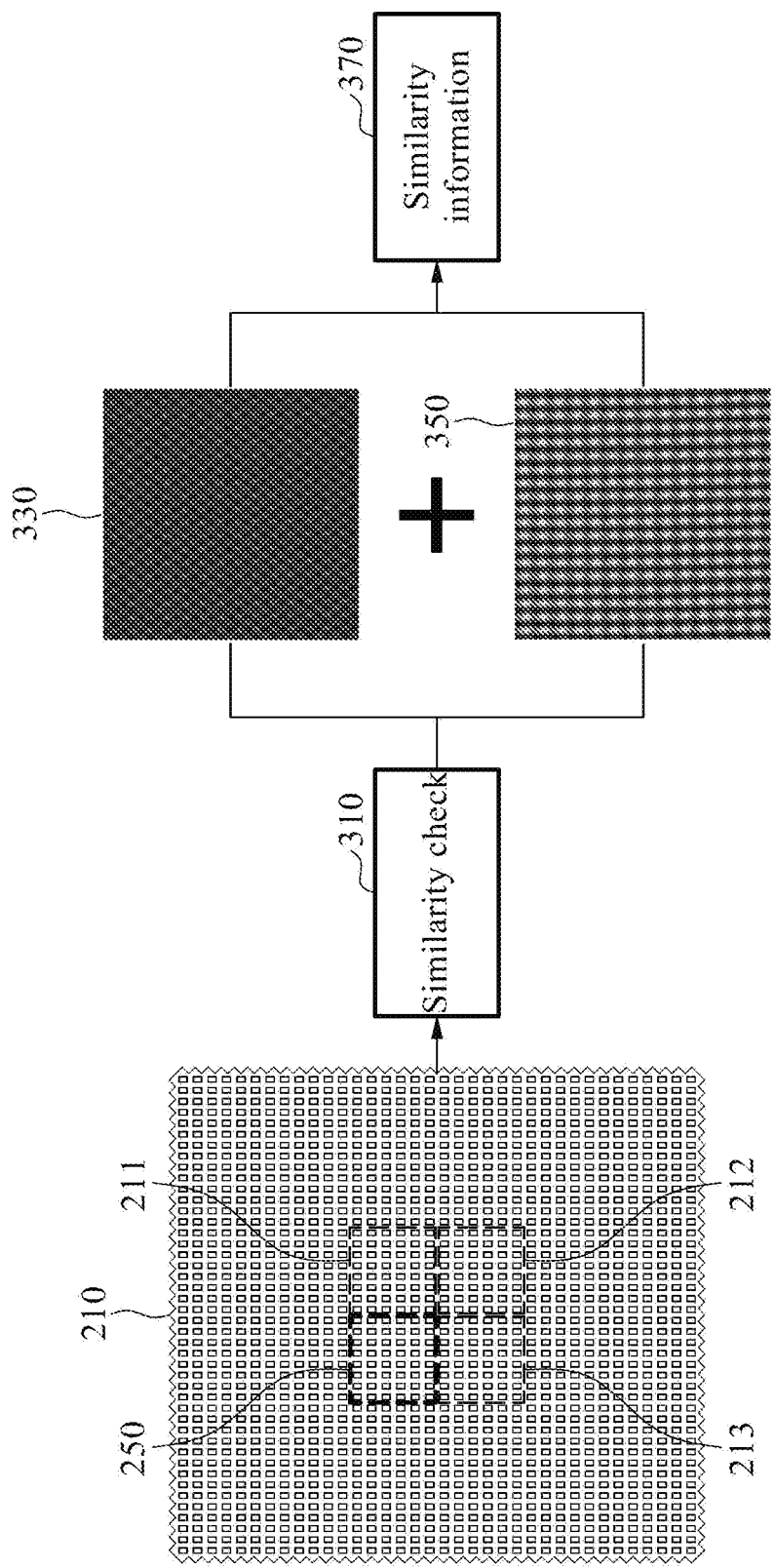
FIG. 3 is a diagram illustrating similarity information according to an example embodiment.

The pattern extractor 120 according to an example embodiment may obtain 122 similarity information 370. The similarity information 370 will be described in detail with reference to FIG. 3. The basic pattern area 250 may be a part of the target analysis area 210 and/or the selected area 230. The processor 1210 according to an example embodiment may generate the similarity information 370 about each similarity between the basic pattern area 250 and each of the plurality of sub areas 211, 212, 213 included in the target analysis area 210. The number of sub areas shown in FIG. 3 is only an example, and the present disclosure is not limited thereto.

The processor 1210 may perform a similarity check 310 to determine the similarity between the basic pattern area 250 and the sub areas 211, 212, and 213, and as a result, generates the similarity information 370. The processor 1210 may generate similarity information about each similarity between the basic pattern area 250 and the sub areas 211, 212, and 213 based on a cross-correlation coefficient method.

The input image may include at least one of a color image and a normal image. The color image may include color information. The normal image may include normal vector information of each pixel included in the input image. To generate the similarity information 370, the processor 1210 may use (i) only the color image, (ii) only the normal image or (iii) both the color image and the normal image. The processor 1210 may supplement the similarity information which is not detected in the color image with the similarity information detected in the normal image.

The similarity information 370 according to an example embodiment may be determined based on at least one of first similarity information 330 about similarity between the basic pattern area and the plurality of sub areas which are at least some part of the selected area of the color image, and second similarity information 350 about similarity between the basic pattern area and the plurality of sub areas which are at least some part of the selected area of the normal image.

The similarity information 370 according to an example embodiment may be determined as a weighted sum of the first similarity information 330 and the second similarity information 350. For example, if the color pattern of the fabric included in the input image includes various colors, the similarity information 370 may be generated by assigning a greater weight on the first similarity information 330 than the second similarity information 350. In this case, the processor 1210 may determine the first similarity information 330 as the similarity information 370. That is, the processor 1210 may not consider the second similarity information 350. As another example, if the color pattern of the fabric includes a small number of colors or if the difference between each color is not significant, the processor 1210 may generate the similarity information 370 by assigning a greater weight on the second similarity information 350 than the first similarity information 330. As another example, if the fabric includes various colors but does not include repeating patterns, the processor 1210 may generate the similarity information 370 by assigning a greater weight on the second similarity information 350 than the first similarity information 330.

The pattern extractor 120 may obtain the information 123 about the repetition number and/or the information 124 about the repetition direction. The method of generating the information 123 about the repetition number and the information 124 about the repetition direction will be described in detail with reference to FIG. 4. The processor 1210 may generate at least one of the information 123 about the repetition number of the basic pattern area and the information 124 about the repetition direction of the basic pattern area based on the similarity information 370. The processor 1210 may perform post-processing on the generated similarity information 370 as illustrated in FIG. 3 to generate the information 123 about the repetition number and/or the information 124 about the repetition direction.

The processor 1210 may blur the similarity information 370 to eliminate noise. Blurring according to an example embodiment may refer to softening or blurring a specific area of an image. Various blurring techniques, including Gaussian blurring may be used for such purpose.

The processor 1210 may calculate a similarity threshold value to extract only areas and/or points with similarity to the basic pattern area 250 greater than or equal to specific criteria in the target analysis area 210. A similarity threshold value according to an example embodiment may be determined by a threshold value extraction method using a histogram. Therefore, the processor 1210 may determine an area with similarity larger than or equal to the similarity threshold value as an area similar to the basic pattern area.

The processor 1210 may perform a fast Fourier transform 410 on the similarity information 370. The processor 1210 may generate a frequency domain image (e.g., fast Fourier transform image 430) by performing frequency domain transform (e.g., fast Fourier transform) on the similarity information 370. Fourier transformed image 430 may include location information of the sub areas similar to the basic pattern area 250.

The processor 1210 may perform a pattern repetition direction check 450 on Fourier transformed image 430. Also, the processor 1210 may perform a pattern repetition number check on Fourier transformed image 430.

The processor 1210 according to an example embodiment may obtain the information 124 about the repetition direction. The information 124 about the repetition direction may include information related to a direction determined based on the distribution direction of the sub areas having a similarity with the basic pattern area 250 greater than or equal to the predetermined criteria (e.g., similarity threshold value) in the target analysis area 210.

The information 124 about the repetition direction according to an example embodiment may include a first direction along which sub areas having a similarity with the basic pattern area 250 greater than or equal to a predetermined criteria based on the location of the basic pattern area 250 are distributed, and a second direction along which sub areas having a similarity with the basic pattern area 250 greater than or equal to a predetermined criteria are distributed. For example, the location of the basic pattern area 250 may include an area and/or a point at which a first direction 471 and a second direction 472 meet. For example, the first direction may be a horizontal direction based on the location of the basic pattern area 250. Also, the second direction may be a vertical direction based on the location of the basic pattern area 250. A first reference line along the first direction and a second reference line along the second direction according to an example embodiment may be a straight line or a curved line according to a curve of the fabric included in the input image.

The repetition number described herein refers to the number of sub areas similar to a basic pattern area greater than or equal to a predetermined criteria (e.g., a similarity threshold value) in a target analysis area or a selected area.

The information 123 about the repetition number according to an example embodiment may be determined based on a first repetition number of the plurality of sub areas distributed along the first direction and a second repetition number of the plurality of sub areas distributed along the second direction. For example, the first repetition number of the plurality of sub areas distributed along the first direction 471 in FIG. 4 may be "10". In this case, it may mean that "11" ("1" basic pattern area+"10" sub areas) sub areas similar to the basic pattern area 250 are repeated in the first direction (e.g., the horizontal direction) in the target analysis image. As another example, the second repetition number of the plurality of sub areas distributed along the second direction 472 in FIG. 4 may be "10". In this case, it may mean that "11" ("1" basic pattern area+"10" sub areas) sub areas similar to the basic pattern area 250 are repeated in the second direction (e.g., the vertical direction) in the target analysis image. If the first repetition number is "10" and the second repetition number is "10", the processor 1210 may obtain information that total "121" ("11"×"11") basic pattern areas are repeated in the target analysis area 210.

Figure 5:
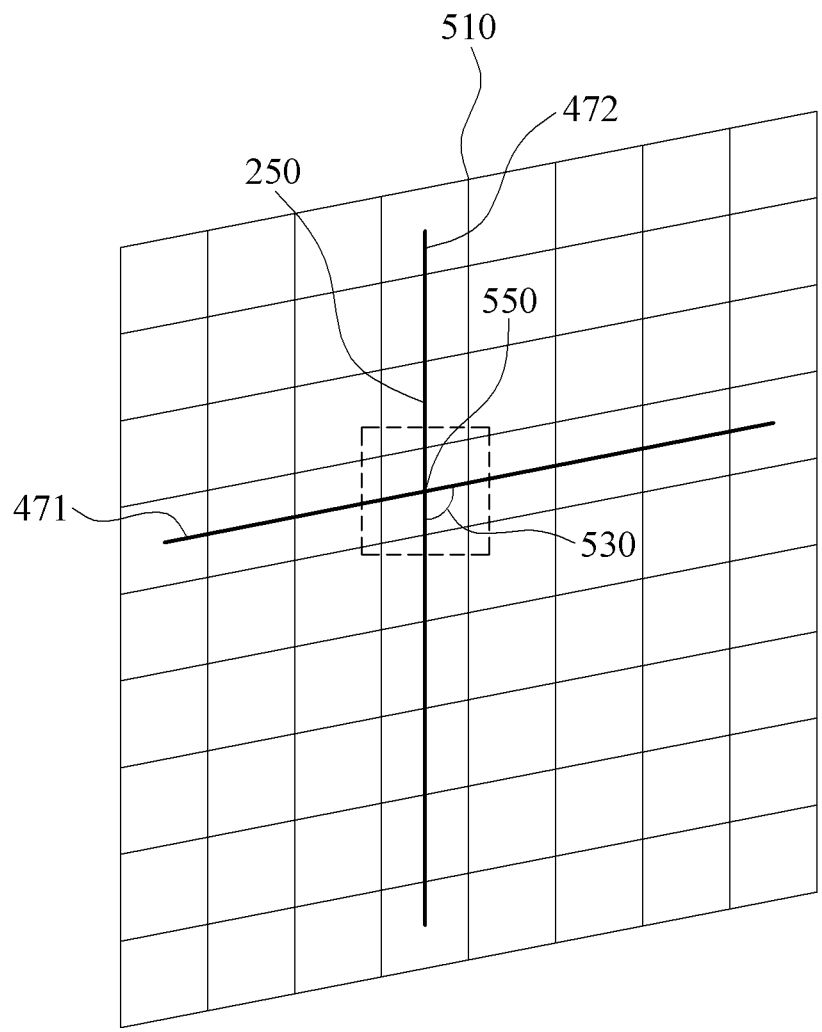
FIG. 5 is a diagram illustrating a method of generating a texture image, according to an example embodiment.

The pattern extractor 120 may generate a texture image 510 (e.g., a texture image 510 of FIG. 5). The generation of the texture image 130 according to an example embodiment will be described in detail with reference to FIG. 5. FIG. 5 illustrates the texture image 510 that includes the basic pattern area 250. The processor 1210 may determine the location of the basic pattern area 250 as well as the first direction 471 and the second direction 472 based on the location and the information 124 about the repetition direction of the basic pattern area 250. The processor 1210 may calculate the first repetition number of the plurality of sub areas distributed along the first direction and the second repetition number of the plurality of sub areas distributed along the second direction 472 based on the information 123 about the repetition number and the information 124 about the repetition direction.

The processor 1210 may generate the texture image 510 (e.g., the texture image 510 of FIG. 5) by repeatedly arranging the basic pattern area based on the first direction 471, the second direction 472, the first repetition number, and the second repetition number. For example, the first repetition number of the sub areas distributed along the first direction 471 may be "7" as illustrated in FIG. 5, and the second repetition number of the sub areas distributed along the second direction 472 may be "8" as illustrated in FIG. 5. Therefore, total "8" ("1" basic pattern area+"7" sub areas) basic pattern areas may be repeated along the first direction. Also, total "9" ("1" basic pattern area+"8" sub areas) basic pattern areas may be repeated along the second direction 472. Therefore, the texture image 510 (e.g., the texture image 510 of FIG. 5) may include an image in which total "72" basic pattern areas 250 are repeatedly arranged.

The texture generator 140 according to an example embodiment may include a module for correcting the texture image 130. The texture generator according to an example embodiment may generate the corrected texture image 150 based on at least one of the pattern correction information 141, the overlapping area information 142, and the brightness correction information 143.

Figure 6:
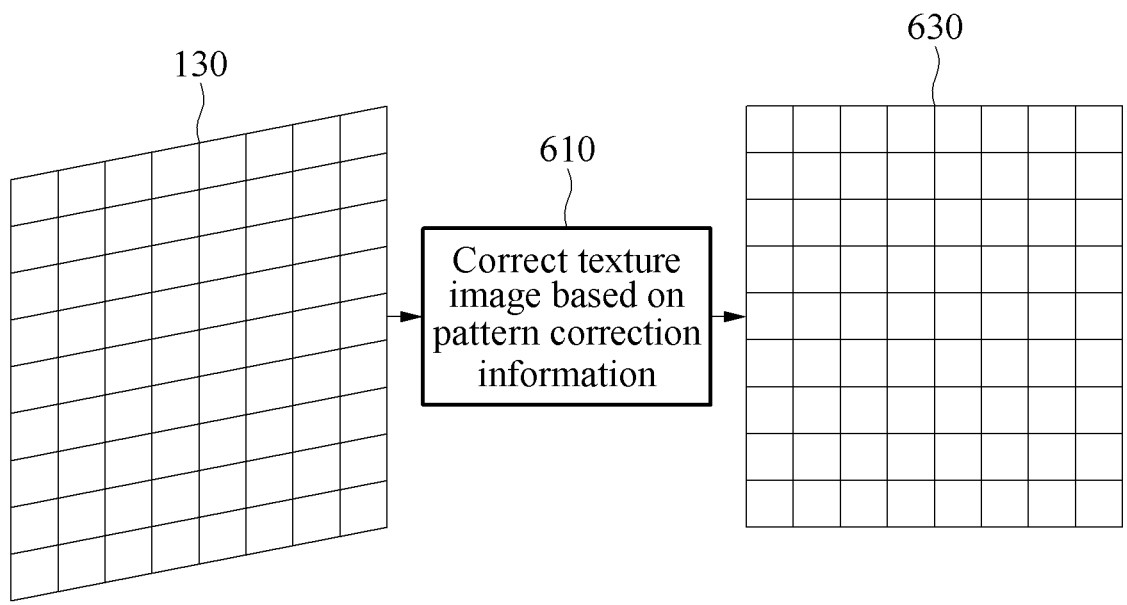
FIG. 6 is a diagram illustrating a method of correcting a texture image based on pattern correction information, according to an example embodiment.

There may be an angle 530 between the first direction 471 and the second direction 472, according to an example embodiment. If the angle 530 is not a right angle, a pattern misalignment may occur in the texture image 510 (e.g., the texture image 510 of FIG. 5). For example, a pattern misalignment may occur in the process of obtaining the input image. A distortion may occur in the fabric included in the input image according to the viewpoint of the image acquisition device which captures the image of the actual fabric, but is not limited thereto. As another example, pattern misalignment may occur when wrinkles exist in the actual fabric. Referring to FIG. 6, in a case in which pattern misalignment occurs, the angle 530 between the first direction 471 and the second direction 472 may not be a right angle. Therefore, it may be necessary to correct the pattern misalignment by correcting the angle 530 between the first direction 471 and the second direction 472 to be a right angle. By correcting the pattern misalignment, inconsistent or discontinuous basic patterns repeating in the texture image during pattern repetition may be resolved. Hereinafter, a method of correcting the texture image 130 will be described in detail with reference to FIG. 6.

The processor 1210 according to an example embodiment may correct 610 the texture image based on the pattern correction information. The pattern correction information according to an example embodiment may include information necessary to correct pattern misalignment. As shown in FIG. 6, if the angle 530 between the first direction 471 and the second direction 472 is not a right angle, pattern misalignment may occur in the texture image 130. Therefore, the processor 1210 may convert the angle 530 between the first direction 471 and the second direction 472 to a right angle.

If the first reference line along the first direction 471 is a curved line, the processor 1210 according to an example embodiment may correct the first reference line so that it becomes vertical relative to the second direction. For example, if there is a curve in the fabric included in the input image 110, the first reference line may be a curved line. In this case, the processor 1210 may correct the curved first reference line by straightening the curved first reference line.

If the second reference line along the second direction 472 is a curved line, the processor 1210 according to an example embodiment may correct the second reference line by straightening the curved first reference line so that the second reference line becomes vertical relative to the first direction. For example, if there is a curve in the fabric included in the input image 110, the second reference line may be a curved line. In this case, the processor 1210 may correct the curved second reference line by straightening the curved first reference line.

The processor 1210 according to an example embodiment may correct the texture image based on the overlapping area information 142. The method of correcting the texture image based on the overlapping area information 142 will be described in detail with reference to FIG. 7.

A discontinuous pattern may occur in an area where the plurality of basic pattern areas meet, as the plurality of basic pattern areas are arranged in the overlapping area information 142, according to an example embodiment. For example, the discontinuous pattern may be a seamline. In order to eliminate such a discontinuous pattern, an overlapping area between the adjacent basic pattern areas may be determined. Through this process, factors that reduce the continuity of the pattern may be eliminated.

The processor 1210 may divide the texture image 130 into a plurality of patches. For example, a patch may correspond to one basic pattern area. As another example, the patch may include a plurality of basic pattern areas. When dividing the texture image 130 according to an example embodiment into 4 areas, a first patch 710, a second patch 730, a third patch 750, and a fourth patch 770 may be generated. The texture image 130 may have the same size as the target analysis area. Since the target analysis area 210 includes the selected area 230, the selected area may be determined based on the location information of the selected area 230 in the texture image 130. When dividing the texture image 130 into a plurality of patches, the processor 1210 may perform the dividing based on the selected area 230. Therefore, the first patch 710 may be included in the selected area corresponding to the first patch 710. The patch may be included in the selected area also for the second patch 730, the third patch 750, and the fourth patch 770.

The processor 1210 may rearrange the plurality of patches. As indicated by texture 701 in which the patches are rearranged, the processor 1210 may rearrange each patch included in the texture image 130 to a first patch 711, a second patch 731, a third patch 751, and a fourth patch 771. Accordingly, the patches 720, 740, 760, and 780 may also be rearranged to areas 721, 741, 761, and 781, as indicated by texture 701 in which the patches are rearranged.

Figure 7:
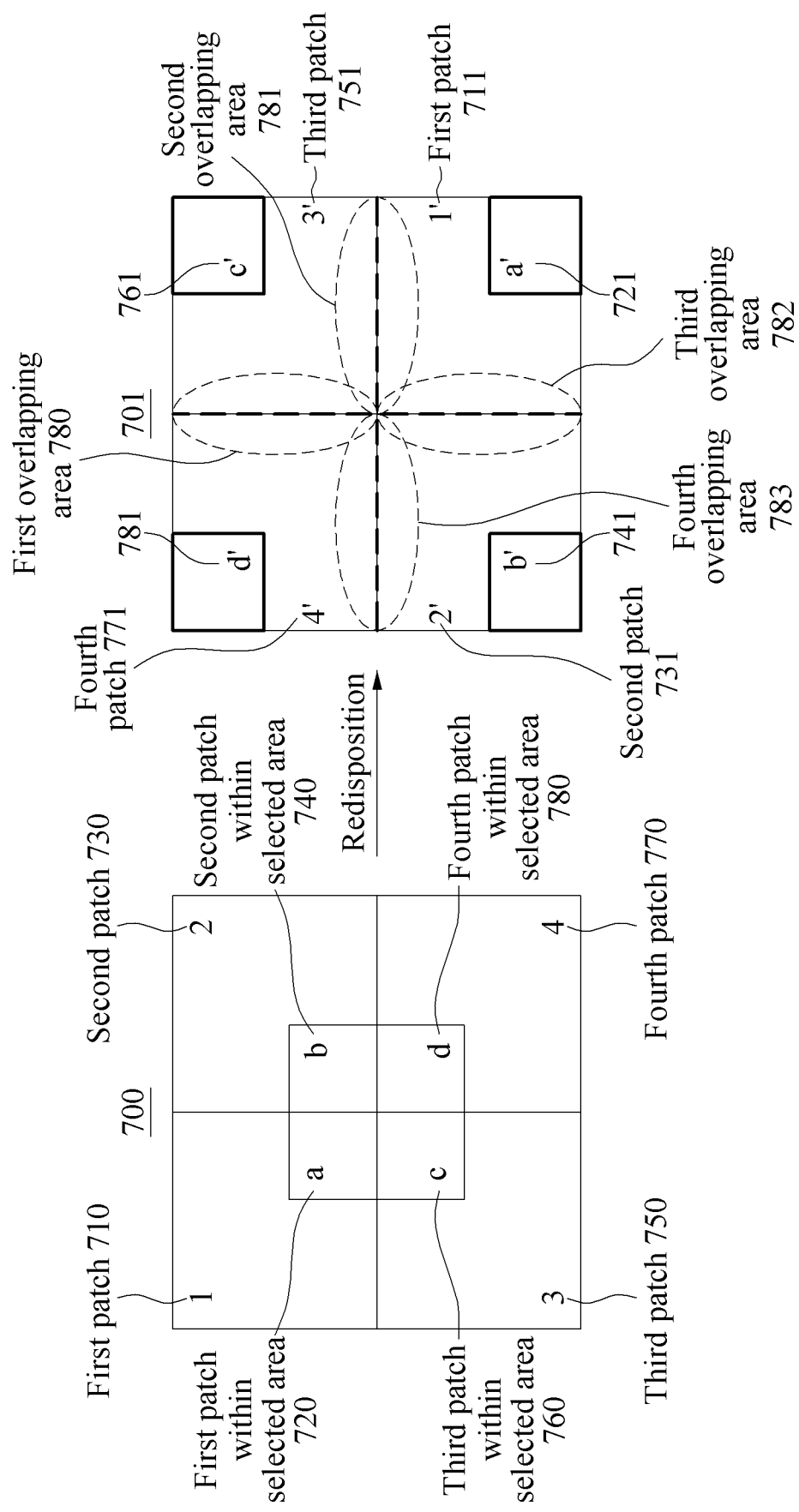
FIG. 7 is a diagram illustrating a method of correcting a texture image based on overlapping area information, according to an example embodiment.

A discontinuous pattern area (e.g., a seamline) may be generated where the rearranged first patch 711, second patch 731, third patch 751, and fourth patch 771 overlap each other. For example, the areas between the first patch 711 and the second patch 731, the first patch 711 and the third patch 751, the second patch 731 and the fourth patch 771, and the third patch 751 and the fourth patch 771 may newly overlap through rearrangement. The adjacent areas may be adjacent to each other when the image 700 illustrated in FIG. 7 is arranged in a repeating manner. Therefore, in order to eliminate a discontinuous pattern (e.g., a seamline) which occurs in newly adjacent areas generated from the repetition of the image 700, overlapping areas between the first patch 711 and the second patch 731, the first patch 711 and the third patch 751, the second patch 731 and the fourth patch 771, and the third patch 751 and the fourth patch 771 may be generated and synthesized. The processor 1210 may determine whether a discontinuous pattern area exists between the first patch 711 and the second patch 731, the first patch 711 and the third patch 751, the second patch 731 and the fourth patch 771, and the third patch 751 and the fourth patch 771. If a discontinuous pattern area is present, the processor 1210 may determine the overlapping areas of the patches. For example, if a discontinuous pattern area is present between the first patch 711 and the third patch 751, the processor 1210 may generate the second overlapping area 781. It may also arrange the patches so that the patches overlap as much as the second overlapping area 781. The same process may be performed for other adjacent areas. For example, the processor 1210 may generate the third overlapping area 782 in which the first patch 711 and the second patch 731 overlap. As another example, the processor 1210 may generate the fourth overlapping area 783 in which the second patch 731 and the fourth patch 771 overlap. As another example, the processor 1210 may generate the first overlapping area 780 in which the third patch 751 and the fourth patch 771 overlap.

Figure 8:
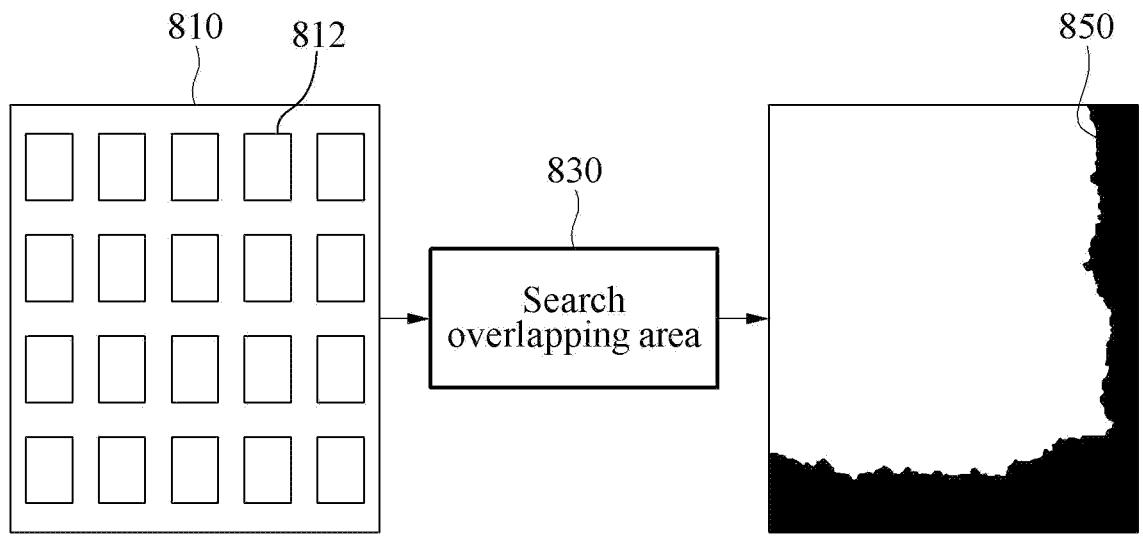
FIG. 8 is a diagram illustrating an overlapping area according to an example embodiment.

The processor 1210 may search for an overlapping area in a patch. Referring to FIG. 8, the processor 1210 may search 830 for an overlapping area in a patch 810. The patch 810 may include patterns. Referring to FIG. 8, small boxes 812 included in the patch 810 collectively represent a pattern. The search may be conducted, for example, by determining whether a discontinuous pattern area exists between patches. The result of the search may be shown as illustrated in FIG. 8 where a black area 850 represents the overlapping area.

Therefore, the processor 1210 may use the information about the searched overlapping area 850 to overlap the plurality of patches.

Figure 9:
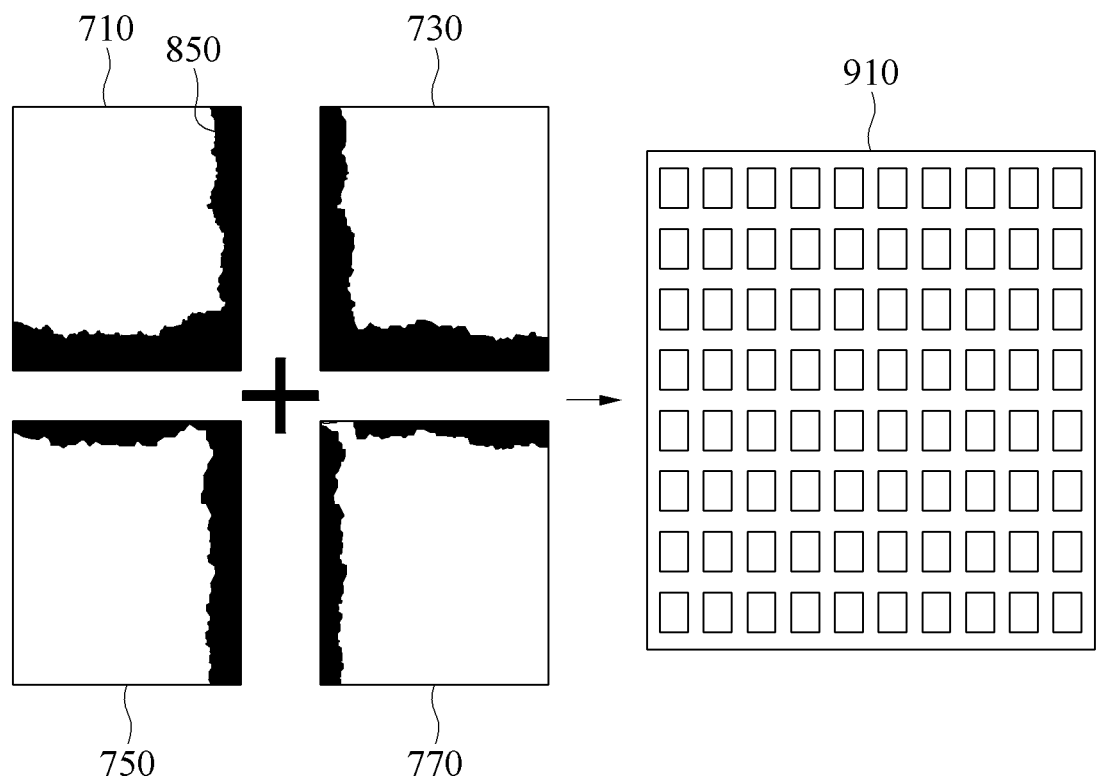
FIG. 9 is a diagram illustrating a method of generating a corrected texture image by eliminating an overlapping area, according to an example embodiment.

The processor 1210 may overlap the plurality of patches based on the overlapping area. Referring to FIG. 9, the processor 1210 may overlap the patches based on the overlapping area 850 of each of the first patch 710, the second patch 730, the third patch 750, and the fourth patch 750. Another processor 1210 according to an example embodiment may overlap the patches based on the overlapping area 850 of each of the rearranged first patch 711, second patch 731, third patch 751, and fourth patch 771. The processor 1210 may overlap a plurality of patches using a multi-image synthesis method. For example, the multi-image synthesis method may include a multi-channel image synthesis method, which creates new images from images obtained from multiple channele. The multi-image synthesis method may be obtain an image matching and synthesis result without boundary noise in the process of synthesizing the image obtained based on a multi-camera.

The processor 1210 according to an example embodiment may perform a smoothing operation on the overlapped patches. The processor 1210 according to an example embodiment may smooth the plurality of patches using a multi-band blending method. The multi-band blending is a tool to blend images. The multi-band blending can make a boundary between matched images natural.

The processor 1210 may correct the texture image based on the brightness correction information 143. A method of correcting the texture image based on the brightness correction information 143 will be described in detail with reference to FIG. 10. A first patch 1011 and a second patch 1012 illustrated in FIG. 10 may have different brightness. In this case, if the brightness between the patches is different, a natural brightness change of the general texture image may not be expressed. To resolve this issue, a uniform brightness may be applied to the entire texture image. Therefore, the processor 1210 may use the brightness correction information 143 to resolve the inconsistent brightness of the texture image appearing due to duplicating of a plurality of basic pattern areas 250. The brightness correction information 143 may include information for correcting inconsistent brightness of an area caused by lighting. For example, the brightness may be high on the upper left part but may become lower towards the lower right part as indicated by image 1030. Such a gradient of brightness change may be expressed as a brightness change direction 1010. Therefore, correction of the brightness of the patches (or basic pattern areas) included in the texture image may be performed.

The processor 1210 may correct the brightness of the plurality of basic pattern areas based on the brightness correction information 143 to reduce inconsistency of brightness between the plurality of basic pattern areas included in the texture image. The processor 1210 may correct the brightness of the basic pattern areas using a sliding window scheme. For example, the processor 1210 may correct the brightness for each basic pattern area while moving basic pattern areas in a brightness correction direction 1020.

The processor 1210 may easily extract repetitive patterns of the fabric with the method of generating and correcting the texture image, according to an example embodiment. The processor 1210 may also apply the fabric to the virtual simulation by generating and correcting the result in a form of a texture composed of repetitive patterns. Therefore, the processor 1210 may visually express the texture expressing the fabric, which is included in the input image, in the garment simulation.

Figure 2:
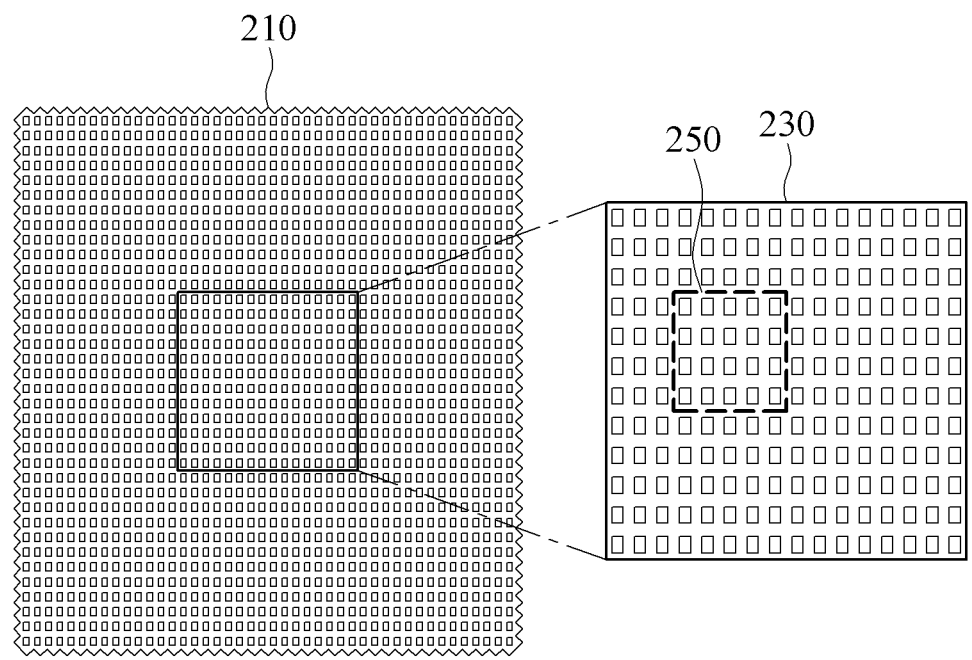
FIG. 2 is a diagram illustrating a target analysis area, selected area and basic pattern area, according to an example embodiment.

FIG. 2 illustrates the target analysis area 210, the selected area 230, and the basic pattern area 250, according to an example embodiment. The target analysis area 210 may include at least part of the input image 110. The selected area 230 may include an area selected by the user. The processor 1210 may determine the selected area 230 in the input image 110 based on information received from a user. The information received from the user may include information related to the area selected by the user. The user according to an example embodiment may select the area for pattern extraction from the input image. The processor 1210 may determine the selected area 230 and then determine the target analysis area 210 from the input image 110 based on the selected area 230. For example, when the selected area 230 is determined, the processor 1210 may determine the target analysis area 210 which is 4 times larger in size than the selected area. The processor 1210 according to an example embodiment may determine the basic pattern area 250 from the selected area 230 and/or the target analysis area 210. The basic pattern area 250 may include a unit pattern which is used to generate a texture image. Therefore, the processor 1210 may duplicate and arrange a plurality of the basic pattern area 250 to generate a texture image.

FIG. 3 is a diagram illustrating similarity information according to an example embodiment. FIG. 3 illustrates the target analysis area 210, the plurality of sub areas 211, 212, and 213, basic pattern area 250, similarity check 310, the first similarity information 330, the second similarity information 350, and the similarity information 370.

The pattern extractor 120 according to an example embodiment may obtain 122 similarity information 370. The similarity information 370 will be described in detail with reference to FIG. 3. The basic pattern area 250 according to an example embodiment may be at least a part of the target analysis area 210. The basic pattern area 250 according to an example embodiment may be at least a part of the selected area 230. The processor 1210 according to an example embodiment may generate the similarity information 370 between the basic pattern area 250 and each of the plurality of sub areas 211, 212, 213 included in the target analysis area 210. The number of sub areas shown in FIG. 3 is only an example, and the present disclosure is not limited thereto.

The processor 1210 a may perform a similarity check 310 to determine the similarity between the basic pattern area 250 and the sub areas 211, 212, and 213. The processor 1210 may generate the similarity information 370 through the similarity check 310. The processor 1210 according to an example embodiment may generate similarity information about similarity between the basic pattern area 250 and the sub areas 211, 212, and 213 based on a cross-correlation coefficient method, generally used for measuring the strength between two variables in time series. For example, the possible range for the correlation coefficient of the time series data is from −1.0 to +1.0.

The input image according to an example embodiment may include at least one of the color image and the normal image. The color image according to an example embodiment may include color information of an input image. The normal image may include normal vector information of each pixel included in the input image. The processor 1210 use the color image to generate the similarity information 370. The processor 1210 according to an example embodiment may use the normal image to generate the similarity information 370. The processor 1210 according to an example embodiment may use the color image and the normal image to generate the similarity information 370. The processor 1210 may supplement the similarity information which is not detected in the color image with the similarity information detected in the normal image.

The similarity information 370 may be determined based on at least one of first similarity information 330 about similarity between the basic pattern area and the plurality of sub areas which are at least some part of the selected area of the color image and second similarity information 350 about each similarity between the basic pattern area and the plurality of sub areas which are at least some part of the selected area of the normal image.

The similarity information 370 may be determined based on a weighted sum of the first similarity information 330 and the second similarity information 350. For example, if the color pattern of the fabric included in the input image includes various colors, the similarity information 370 may be generated by assigning a greater weight on the first similarity information 330 than the second similarity information 350. In this case, the processor 1210 may determine the first similarity information 330 as the similarity information 370. That is, the processor 1210 may not consider the second similarity information 350. As another example, if the color pattern of the fabric includes a small number of colors or if the difference between each color is not great, the processor 1210 may generate the similarity information 370 by assigning a greater weight on the second similarity information 350 than the first similarity information 330. As another example, if the fabric includes various colors but does not include repeating patterns, the processor 1210 may generate the similarity information 370 by putting greater weight on the second similarity information 350 than the first similarity information 330.

Figure 4:
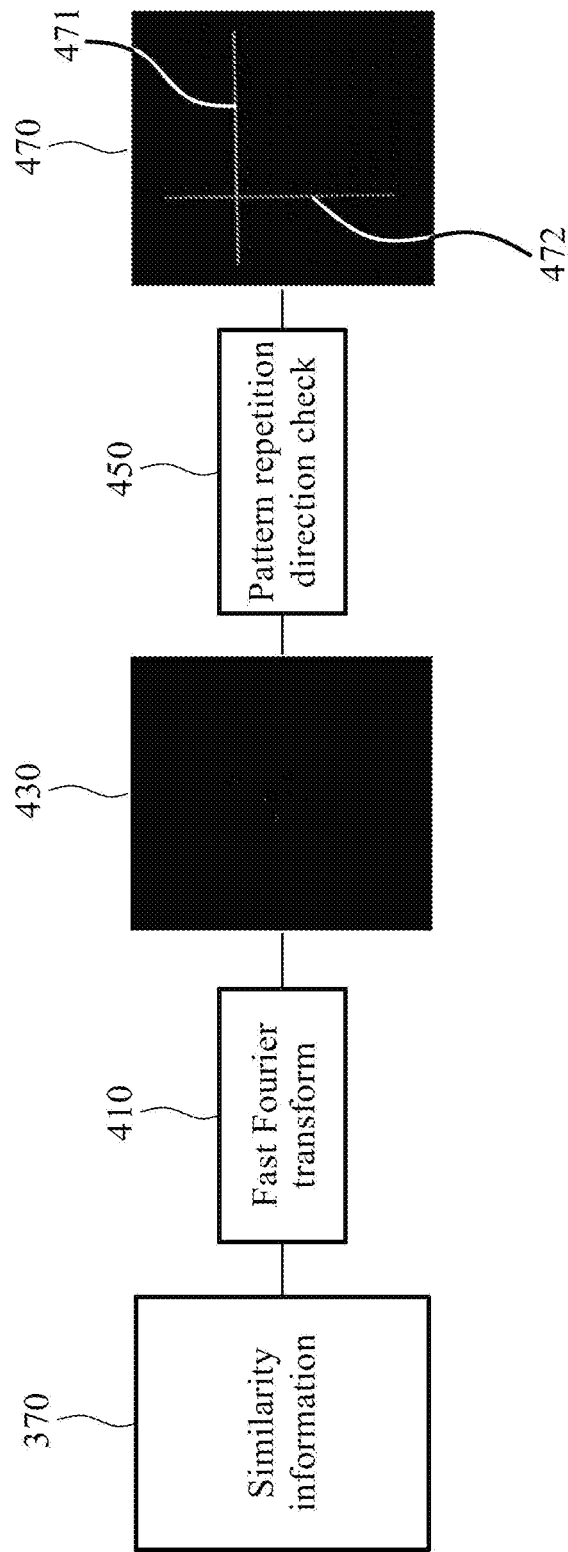
FIG. 4 is a diagram illustrating information about a repetition number and information about a repetition direction, according to an example embodiment.

FIG. 4 is a diagram illustrating information about a repetition number and information about a repetition direction, according to an example embodiment. FIG. 4 illustrates the similarity information 370, fast Fourier transform 410, Fourier transformed image 430, pattern repetition direction check 450, information about the repetition direction 470, the first direction 471, and the second direction 472.

The processor 1210 may generate at least one of (i) the information 123 about the repetition number of the basic pattern area and (ii) the information 124 about the repetition direction of the basic pattern area based on the similarity information 370. The processor 1210 may perform post-processing on the generated similarity information 370 as illustrated in FIG. 3 to generate the information 123 about the repetition number and/or the information 124 about the repetition direction.

The processor 1210 may blur the similarity information 370 to eliminate noise. Blurring according to an example embodiment may refer to softening or blurring a specific area of an image. Various blurring techniques, including Gaussian blurring, may be used.

The processor 1210 according to an example embodiment may calculate a similarity threshold value to extract areas and/or points that are similar to the basic pattern area 250 to a degree greater than or equal to specific criteria in the target analysis area 210. The similarity threshold value according to an example embodiment may be determined by a threshold value extraction method using a histogram. The threshold extraction method may be a method of extracting points having a high similarity from a histogram and determining a threshold based on points having a high similarity. Therefore, the processor 1210 may determine an area having a similarity that is greater than or equal to the similarity threshold value as an area similar to the basic pattern area.

The processor 1210 may perform a fast Fourier transform 410 on the similarity information 370. The processor 1210 may generate a fast Fourier transform image 430 by performing a fast Fourier transform on the similarity information 370. Fourier transformed image 430 according to an example embodiment may include location information of the sub areas similar to the basic pattern area 250.

The processor 1210 may perform a pattern repetition direction check 450 on Fourier transformed image 430. Also, the processor 1210 may perform a pattern repetition number check on Fourier transformed image 430.

The processor 1210 according to an example embodiment may obtain the information 124 about the repetition direction. The information 124 about the repetition direction may include information related to a direction determined based on the distribution direction of the sub areas that are similar to the basic pattern area 250 to a degree greater than or equal to the predetermined criteria (e.g., similarity threshold value) in the target analysis area 210.

The information 124 about the repetition direction according to an example embodiment may include a first direction in which sub areas which have a similarity with the basic pattern area 250 greater than or equal to a predetermined criteria based on the location of the basic pattern area 250 are distributed, and a second direction in which sub areas which have a similarity with the basic pattern area 250 greater than or equal to a predetermined criteria are distributed. For example, the location of the basic pattern area 250 may include an area and/or point in which a first direction 471 and a second direction 472 meet. For example, the first direction may be a horizontal direction based on the location of the basic pattern area 250. Also, the second direction may be a vertical direction based on the location of the basic pattern area 250. A first reference line along the first direction and a second reference line along the second direction may be a straight line or a curved line according to a curve of the fabric included in the input image.

The information about the repetition number according to an example embodiment may include information about the number of sub areas with similarity to the basic pattern area 250 to a degree greater than or equal to the predetermined criteria (e.g., a similarity threshold value) in the target analysis area 210. According to an example embodiment, information 123 about the repetition number may include information about the number of sub areas having a similarity with the basic pattern area 250 greater than or equal to the predetermined criteria in the selected area 230.

The information 123 about the repetition number according to an example embodiment may be determined based on a first repetition number of the plurality of sub areas distributed along the first direction and a second repetition number of the plurality of sub areas distributed along the second direction. For example, the first repetition number of the plurality of sub areas distributed along the first direction 471 in FIG. 4 may be "10". In this case, it may mean that "11" ("1" basic pattern area+"10" sub areas) sub areas similar to the basic pattern area 250 and the basic pattern area are repeated in the first direction (e.g., the horizontal direction) in the target analysis image. As another example, the second repetition number of the plurality of sub areas distributed along the second direction 472 in FIG. 4 may be "10". In this case, it may mean that "11" ("1" basic pattern area+"10" sub areas) sub areas similar to the basic pattern area 250 and the basic pattern area are repeated in the second direction (e.g., the vertical direction) in the target analysis image. If the first repetition number is "10" and the second repetition number is "10", the processor 1210 may obtain information that total "121" ("11"×"11") basic pattern areas are repeated in the target analysis area 210.

FIG. 5 is a diagram illustrating a method of generating a texture image according to an example embodiment. FIG. 5 illustrates the texture image 510, the basic pattern area 250, the first direction 471, the second direction 472, the angle 530, and a location of the basic pattern area 550. FIG. 5 example may illustrate the texture image 510. The basic pattern area 250 may be included in the texture image 510. The processor 1210 may determine the location of the basic pattern area 250. The processor 1210 according to an example embodiment may determine the first direction 471 and the second direction 472 based on the location and the information 124 about the repetition direction of the basic pattern area 250. The processor 1210 may calculate the first repetition number of the plurality of sub areas distributed along the first direction and the second repetition number of the plurality of sub areas distributed along the second direction 472 based on the information 123 about the repetition number and the information 124 about the repetition direction.

The processor 1210 may generate the texture image 510 by repeatedly arranging the basic pattern area based on the first direction 471, the second direction 472, the first repetition number, and the second repetition number. For example, the first repetition number of the sub areas distributed along the first direction 471 may be "7" as illustrated in FIG. 5, and the second repetition number of the sub areas distributed along the second direction 472 may be "8" as illustrated in FIG. 5. Therefore, total "8" ("1" basic pattern area+"7" sub areas) basic pattern areas may be repeated along the first direction. Also, total "9" ("1" basic pattern area+"8" sub areas) basic pattern areas may be repeated along the second direction 472. Therefore, the texture image 510 may include an image in which total "72" basic pattern areas 250 are repeatedly arranged.

An angle 530 between the first direction 471 and the second direction 472 according to an example embodiment may exist. FIG. 6 is a diagram illustrating a method of correcting a texture image based on pattern correction information according to an example embodiment. FIG. 6 illustrates the correction 610 of the texture image and a corrected texture image 630 based on the texture image 130 and the pattern correction information.

The processor 1210 may correct 610 the texture image based on the pattern correction information. The pattern correction information may include information necessary to correct pattern misalignment. As shown in FIG. 6, if the angle 530 between the first direction 471 and the second direction 472 is not a right angle, pattern misalignment may occur in the texture image 130. Therefore, the processor 1210 may convert the angle 530 between the first direction 471 and the second direction 472 to a right angle by applying a homography function on the texture image 130.

In one embodiment, Discrete Fourier Transform (DFT) is performed on the texture image 130 to determine the repetition directions in the texture image 130 in which the pattern repeats. Based on the repetition directions, a transformation matrix for the homography function is determined to convert the texture image 130 into an image 630 where the repetition directions cross at 90 degrees (i.e., right angle).

If the first reference line along the first direction 471 is a curved line, the processor 1210 may correct the first reference line so that it becomes vertical relative to the second direction. For example, if there is a curve in the fabric included in the input image 110, the first reference line may be a curved line. In this case, the processor 1210 may correct the curved first reference line by straightening the curved first reference line.

If the second reference line along the second direction 472 is a curved line, the processor 1210 may correct the second reference line into a straight line so that the second reference line becomes vertical relative to the first direction. For example, if there is a curve in the fabric included in the input image 110, the second reference line may be a curved line. In this case, the processor 1210 may correct the curved second reference line by straightening the curved first reference line.

FIG. 7 is a diagram illustrating a method of correcting a texture image based on overlapping area information, according to an example embodiment. FIG. 7 illustrates the plurality of patches 710, 730, 750, 770, the plurality of patches 720, 740, 760, 780 within the selected area, the rearranged plurality of patches 711, 731, 751, 771, the plurality of patches 721, 741, 761, 781 within the rearranged selected area, and the plurality of overlapping areas 780, 781, 782, and 783.

The processor 1210 may divide the texture image 130 into a plurality of patches. For example, a patch may correspond to one basic pattern area. As another example, the patch may include a plurality of basic pattern areas. When dividing the texture image 130 according to an example embodiment into 4 areas, a first patch 710, a second patch 730, a third patch 750, and a fourth patch 770 may be generated. The texture image 130 according to an example embodiment may have the same size as the target analysis area. Since the target analysis area 210 includes the selected area 230, the selected area may be determined based on the location information of the selected area 230 in the texture image 130. When dividing the texture image 130 into a plurality of patches, the processor 1210 may perform the dividing based on the selected area 230. Therefore, the first patch 710 may be included in the selected area corresponding to the first patch 710. The patch may be included in the selected area also for the second patch 730, the third patch 750, and the fourth patch 770.

The processor 1210 may rearrange the plurality of patches. As indicated by texture 701 in which the patches are rearranged, the processor 1210 may rearrange each patch included in the texture image 130 to a first patch 711, a second patch 731, a third patch 751, and a fourth patch 771. Accordingly, the patches 720, 740, 760, and 780 may also be rearranged to areas 721, 741, 761, and 781, as indicated by texture 701 in which the patches are rearranged.

A discontinuous pattern area (e.g., a seamline) may be generated where the rearranged first patch 711, second patch 731, third patch 751, and fourth patch 771 overlap each other. For example, the areas between the first patch 711 and the second patch 731, the first patch 711 and the third patch 751, the second patch 731 and the fourth patch 771, and the third patch 751 and the fourth patch 771 may be newly overlapped through rearrangement. The adjacent areas may be adjacent to each other when the image 700 illustrated in FIG. 7 is arranged in a repeating manner. Therefore, in order to eliminate a discontinuous pattern (e.g., a seamline) which occurs in newly adjacent areas generated from the repetition of the image 700, overlapping areas between the first patch 711 and the second patch 731, the first patch 711 and the third patch 751, the second patch 731 and the fourth patch 771, and the third patch 751 and the fourth patch 771 may be generated and synthesized. The processor 1210 may determine whether a discontinuous pattern area exists between the first patch 711 and the second patch 731, the first patch 711 and the third patch 751, the second patch 731 and the fourth patch 771, and the third patch 751 and the fourth patch 771. If a discontinuous pattern area exists, the processor 1210 may determine the overlapping areas of the patches. For example, if a discontinuous pattern area exists between the first patch 711 and the third patch 751, the processor 1210 may generate the second overlapping area 781. It may also arrange the patches so that the patches overlap as much as the second overlapping area 781. The same process may be performed for other adjacent areas. For example, the processor 1210 may generate the third overlapping area 782 in which the first patch 711 and the second patch 731 overlap. As another example, the processor 1210 may generate the fourth overlapping area 783 in which the second patch 731 and the fourth patch 771 overlap. As another example, the processor 1210 may generate the first overlapping area 780 in which the third patch 751 and the fourth patch 771 overlap.

FIG. 8 is a diagram illustrating an overlapping area according to an example embodiment. FIG. 8 illustrates the patch 810, the overlapping area search 830, and the overlapping area 850. The processor 1210 may search for an overlapping area in a patch. Referring to FIG. 8, the processor 1210 may search 830 for an overlapping area in a patch 810. The result of the search may be shown as illustrated in FIG. 8. Therefore, the processor 1210 may use the information about the searched overlapping area 850 to overlap the plurality of patches.

FIG. 9 is a diagram illustrating a method of generating a corrected texture image by eliminating an overlapping area according to an example embodiment. FIG. 9 illustrates the first patch 710, the second patch 730, the third patch 750, the fourth patch 770, the overlapping area 850, and a corrected texture image 910. The processor 1210 may overlap the plurality of patches based on the overlapping area. Referring to FIG. 9, the processor 1210 may overlap the patches based on the overlapping area 850 of each of the first patch 710, the second patch 730, the third patch 750, and the fourth patch 750. Another processor 1210 according to an example embodiment may overlap the patches based on the overlapping area 850 of each of the rearranged first patch 711, second patch 731, third patch 751, and fourth patch 771. The processor 1210 may overlap a plurality of patches using a multi-image synthesis method. The multi-image synthesis method may be a method of obtaining an image matching and synthesis result without boundary noise in the process of synthesizing the image obtained by a multi-camera setup.

The processor 1210 according to an example embodiment may perform a smoothing operation on the overlapped patches. The processor 1210 according to an example embodiment may smooth the plurality of patches using a multi-band blending method.

Figure 10:
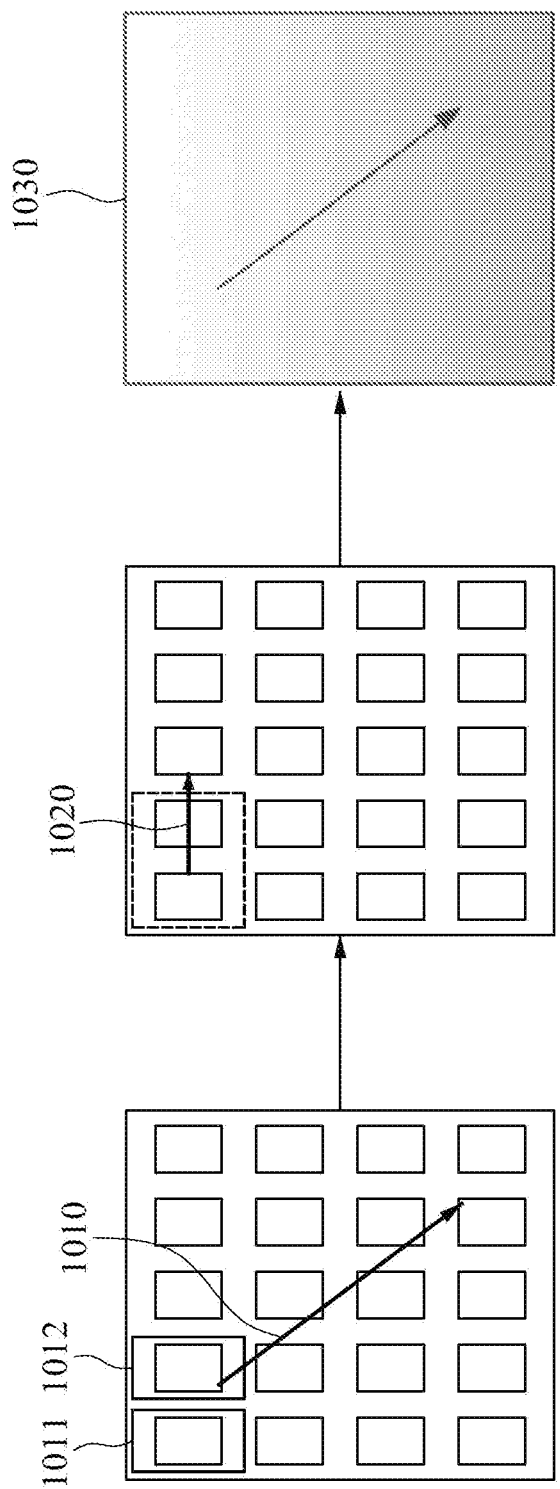
FIG. 10 is a diagram illustrating a method of correcting a texture image based on brightness correction information, according to an example embodiment.

FIG. 10 is a diagram illustrating a method of correcting a texture image based on brightness correction information according to an example embodiment. FIG. 10 illustrates the brightness change direction 1010, the first patch 1011, the second patch 1012, the brightness correction direction 1020, and the degree 1030 of brightness change. The processor 1210 may correct the texture image based on the brightness correction information 143. A method of correcting the texture image based on the brightness correction information 143 will be described in detail with reference to FIG. 10. A first patch 1011 and a second patch 1012 illustrated in FIG. 10 may each have a different brightness. In this case, if the brightness between the patches is different, a natural brightness change of the general texture image may not be expressed. Therefore, a preprocessing may be performed on the entire texture image so that the overall brightness of the texture image is uniform. Therefore, the processor 1210 may use the brightness correction information 143 to resolve the inconsistent brightness of the texture image disposed by duplicating a plurality of basic pattern areas 250. The brightness correction information 143 may include information for correcting inconsistent brightness of an area caused by lighting. For example, the brightness may be high in the upper left part but may become lower towards the lower right part as indicated by degree 1030 of brightness change. Such a gradient of brightness change may be expressed as a brightness change direction 1010. Therefore, the brightness of the patches (or basic pattern areas) included in the texture image may be corrected.

The processor 1210 may correct the brightness of the plurality of basic pattern areas based on the brightness correction information 143 to reduce inconsistency of brightness between the plurality of basic pattern areas included in the texture image. The processor 1210 may correct the brightness of the basic pattern areas by a sliding window scheme. For example, the processor 1210 may correct the brightness by basic pattern area, by moving the sliding window which has the same size of the basic pattern area according to a brightness correction direction 1020.

Figure 11:
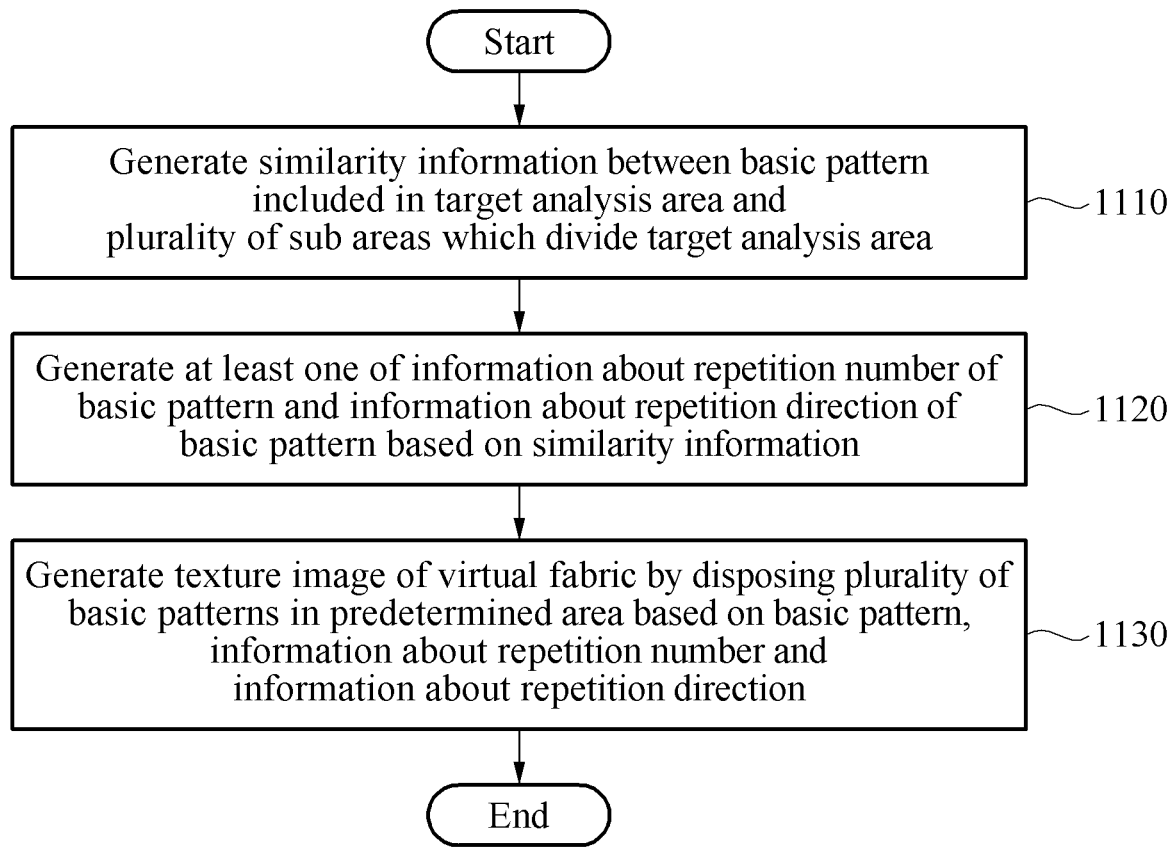
FIG. 11 is a flowchart illustrating a method of generating a texture according to an example embodiment.

FIG. 11 is a flowchart illustrating a method of generating a texture, according to an example embodiment. An electronic device 1200 according to an example embodiment (e.g., the electronic device 1200 of FIG. 12) may determine 1110 the selected area in the input image which includes the fabric.

The electronic device 1200 may determine 1120 the target analysis area in the input image based on the selected area.

The electronic device 1200 may generate 1130 similarity information about a similarity between the basic pattern area which is at least a part of the target analysis area and the plurality of sub areas which are included in the target analysis area.

The electronic device 1200 may generate 1140 at least one of the information about the repetition number of the basic pattern area and the information about the repetition direction of the basic pattern area, based on the similarity information.

The electronic device 1200 may generate 1160 the texture image by disposing the plurality of basic pattern areas in a predetermined area based on at least one of the basic pattern area, the location of the basic pattern area, the information about the repetition number, and the information about the repetition direction.

Figure 12:
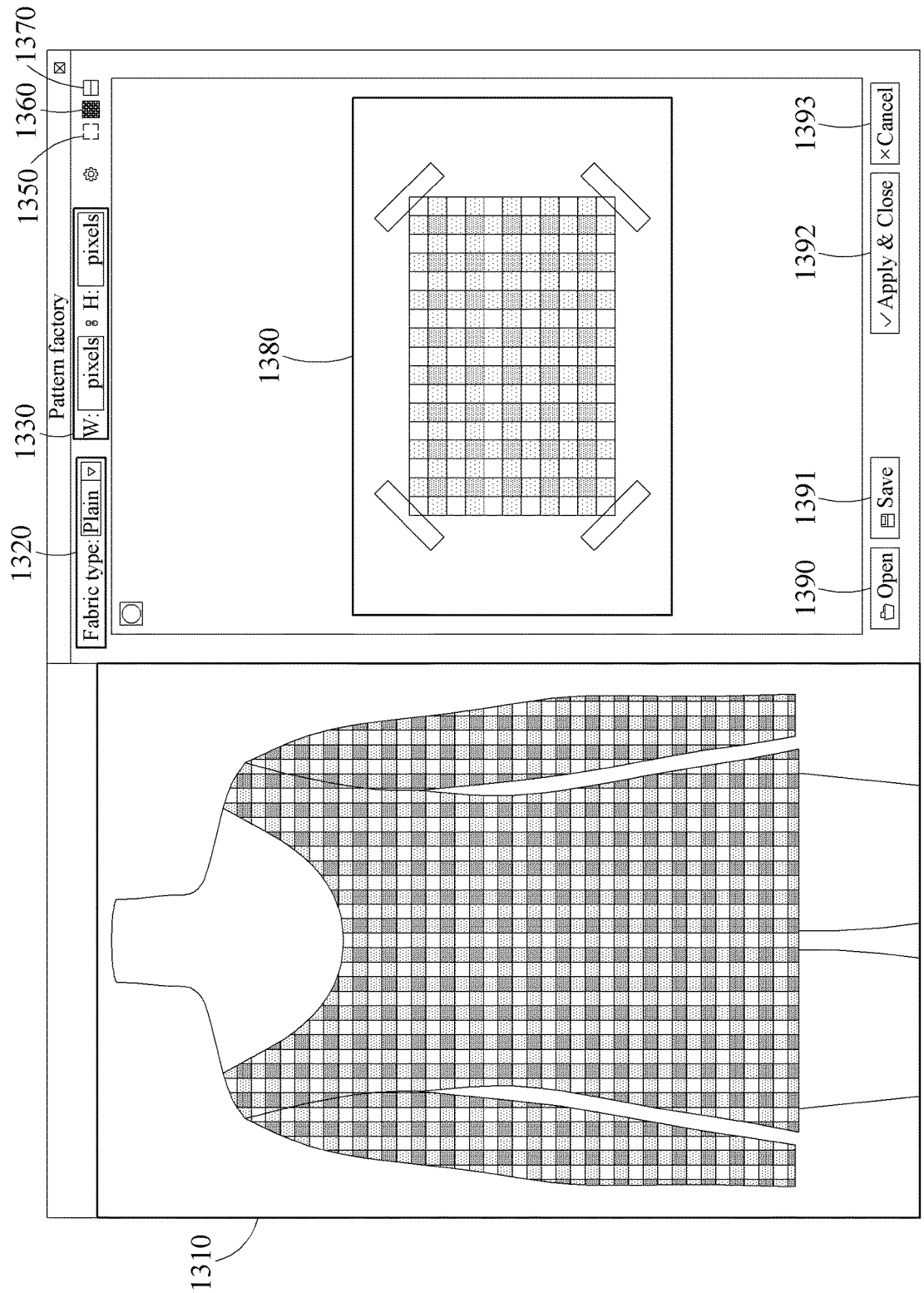
FIG. 12 is a diagram illustrating a three-dimensional garment simulation in which a texture image is reflected, according to an example embodiment.

FIG. 12 is a diagram illustrating a three-dimensional garment simulation in which a texture image is applied, according to an example embodiment. FIG. 12 illustrates a 3-dimensional simulation screen 1310, a fabric type 1320, a size 1330 of a fabric, an input image display object 1350, a texture image display object 1360, an input image and texture image display object 1370, an open object 1390, a storage object 1391, an application object 1392, a cancel object 1393, and an input image 1380.

The 3D simulation screen 1310 includes a 3D garment applied with the texture image based on the input image 1380. The processor 1210 may generate a 3D garment based on the texture image and output the 3D simulation screen 1310. Therefore, when the input image or the texture image changes, the processor 1210 may generate a 3D garment corresponding to the input image or the texture image and output the 3D garment to the 3D simulation screen 1310.

The fabric type 1320 may be an object by which the processor 1210 may receive the information about the fabric type received from the user. For example, the user may input the fabric type through the fabric type 1320. The fabric type may include, for example, a plain, repeating pattern, a random color pattern, and a non-fabric.

The size 1330 may be an object that shows the size of the input image or the texture image. The input image display object 1350 may be an object for outputting the input image to the screen. When the processor 1210 receives the selection input of the input image display object 1350, the input image 1380 may be output to the screen.

The texture image display object 1360 may be an object for outputting the texture image to the screen. The texture image display object 1360 will be described in detail with reference to FIG. 13A below.

The input image and texture image display object 1370 may be an object for outputting the input image and the texture image to the screen at the same time. The input image and texture image display object 1370 will be described in detail with reference to FIG. 13B below.

The open object 1390 may be an object for loading another input image or texture image. The storage object 1391 may be an object for storing the current input image or texture image. The application object 1392 may be an object for generating the third garment based on the input image or texture image. The cancel object 1393 may be an object for stopping the process of generating the 3D garment based on the input image or the texture image.

Figure 13A:
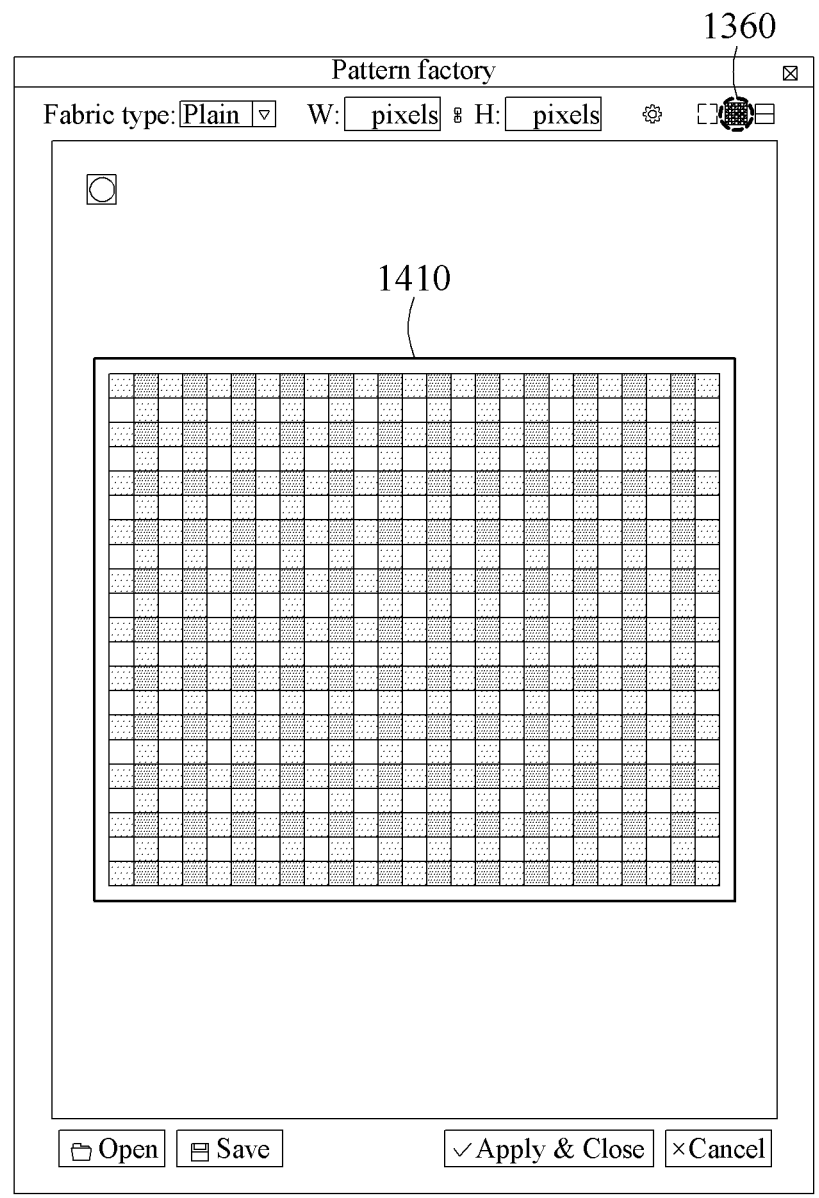
FIGS. 13A and 13B are diagrams illustrating a method of outputting at least one of an input image and a texture image to a screen, according to an example embodiment.
Figure 13B:
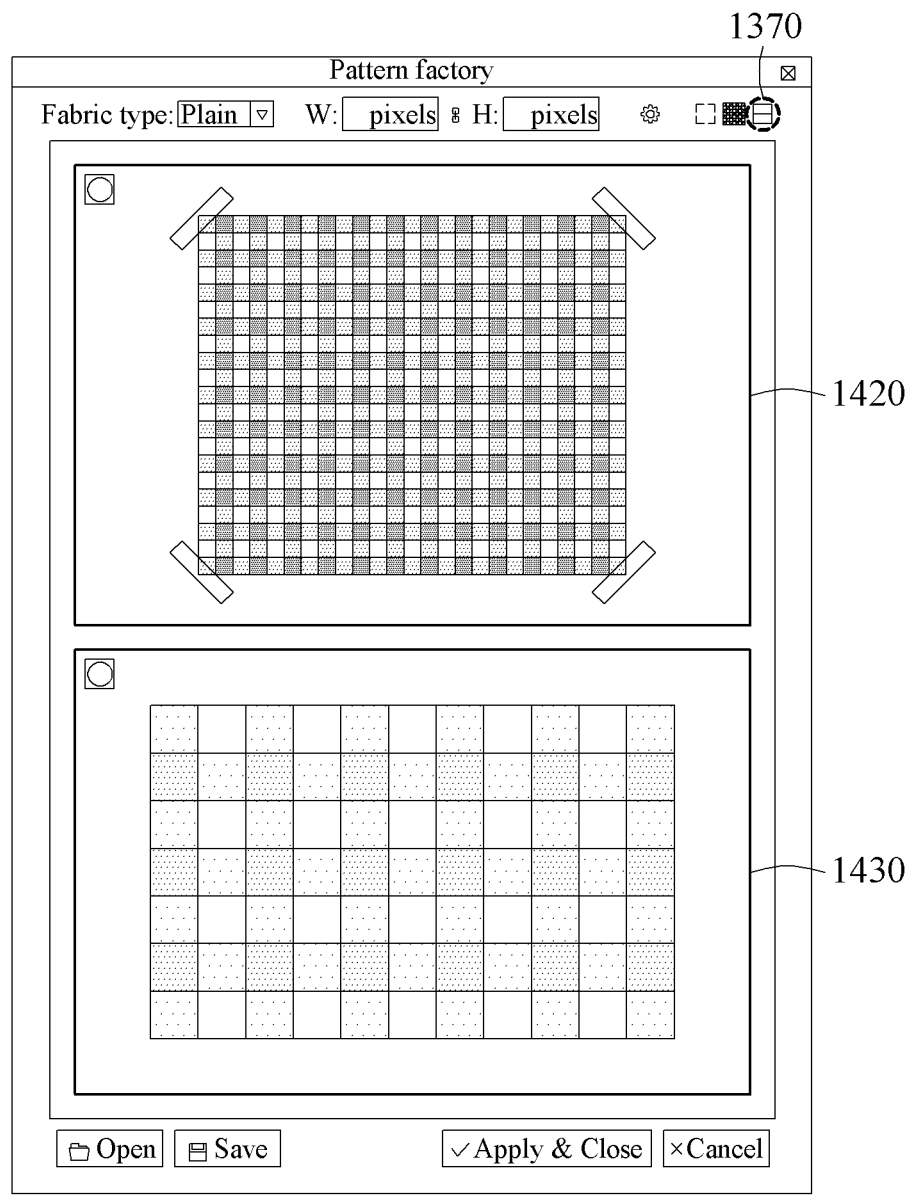

FIGS. 13A and 13B are diagrams illustrating a method of outputting at least one of an input image and a texture image to a screen, according to an example embodiment. When receiving the selection input of the texture image display object 1360, the processor 1210 may output the texture image 1410 to the screen.

When receiving the selection input of the input image and texture image display object 1370, the processor 1210 may output the input image 1420 and the texture image 1430 to the screen.

Through this process, the user may output at least one of the input image and the texture image, and confirm the simulation result in which at least one of the input image and the texture image is applied to the 3D garment.

Figure 14:
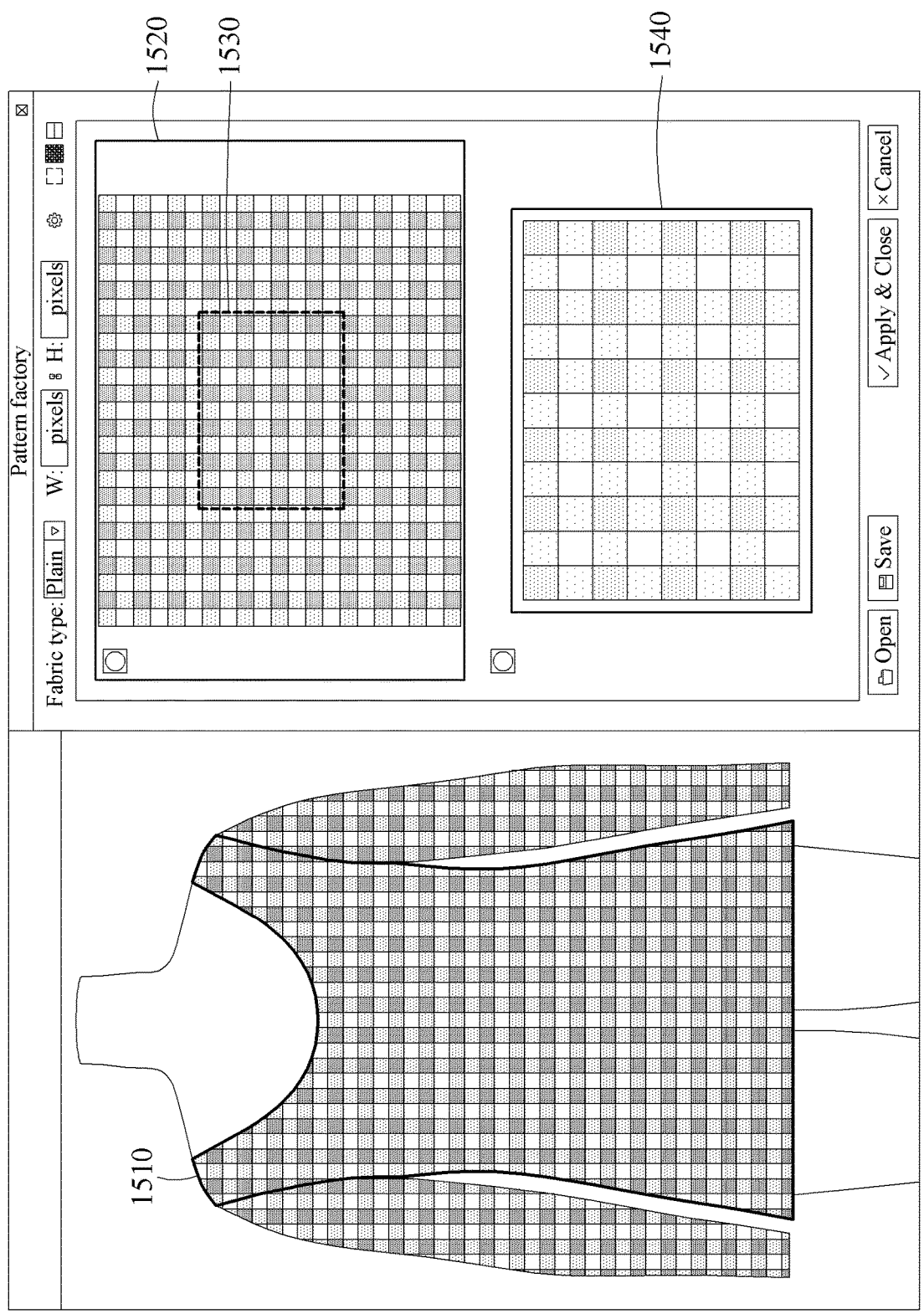
FIG. 14 is a diagram illustrating a method of adjusting a size of a texture image in a three-dimensional garment simulation, according to an example embodiment.

FIG. 14 is a diagram illustrating a method of adjusting a size of a texture image in a three-dimensional garment simulation, according to an example embodiment. FIG. 14 illustrates a partial area 1510 of the 3D garment, a texture image 1520, a selected area 1530, and a texture image 1540 corresponding to the selected area.

The processor 1210 according to an example embodiment may generate a 3D garment to which at least a partial area of the texture image is applied. The user may use only a partial area of the texture image, which is generated based on the input image, for the garment design. In this case, the processor 1210 may generate the 3D garment based on at least a part of the texture image. Furthermore, the processor 1210 may output the simulation result on the screen, wherein the 3D avatar is wearing the 3D garment generated based on at least a part of the texture image in the simulation result. For example, the processor 1210 may receive the selected area 1530 which is a partial area of the texture image 1520 from the user. The processor 1210 may output the texture image 1540 corresponding to the selected area to the screen based on the selected area 1530. The processor 1210 may generate the 3D garment based on the texture image 1540 corresponding to the selected area, and may output the 3D avatar wearing the 3D garment to the screen.

The processor 1210 may adjust the size of the texture image. The processor 1210 may adjust the size of the texture image expressed in the 3D garment. When the size of the texture image is adjusted, the size of the pattern and others expressed in the 3D garment may be adjusted. For example, the processor 1210 may receive a selection input about the partial area 1510 of the 3D garment. A partial area 1510 of the 3D garment may be a pattern (e.g., front body pattern). The processor 1210 may adjust the size of the texture image with respect to the partial area 1510 of the 3D garment. In this case, the size of the texture image displayed on the partial area of the 3D garment may be adjusted. For example, if the user enlarges the texture image, the size of the texture image displayed on the partial area of the 3D garment may be increased. If a pattern is included in the texture image, the pattern may become larger.

Figure 15:
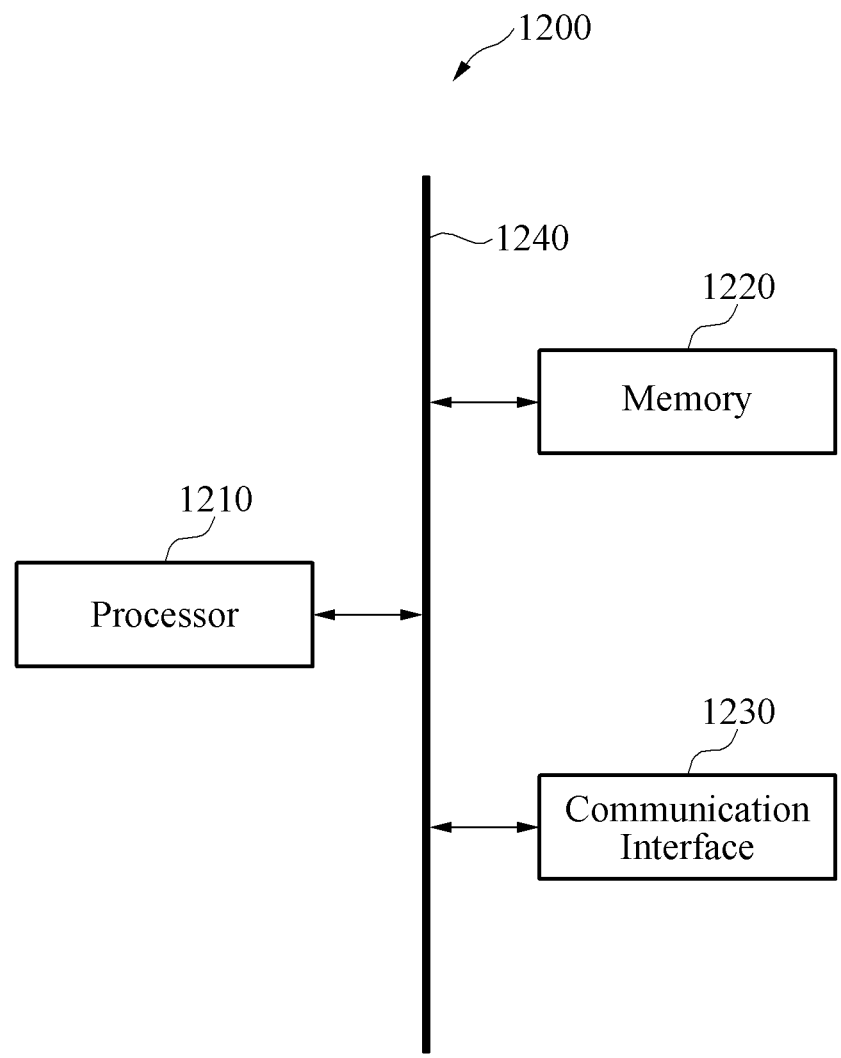
FIG. 15 is a block diagram illustrating an electronic device according to an example embodiment.

FIG. 15 is a block diagram illustrating an electronic device according to an example embodiment. FIG. 15 illustrates an electronic device according to an example embodiment. Referring to FIG. 15, the electronic device 1200 according to an example embodiment may include a memory 1220, the processor 1210, and a communication interface 1230. The memory 1220, the processor 1210, and the communication interface 1230 may be connected to each other via a communication bus 1240.

The memory 1220 may store a variety of information generated in the processing process of the processor 1210 described above. Also, the memory 1220 may store a variety of data and programs. The memory 1220 may include a volatile memory or a non-volatile memory. The memory 1220 may include a large-capacity storage medium such as a hard disk to store a variety of data.

The processor 1210 may be a hardware-implemented apparatus having a circuit that is physically structured to execute desired operations. The desired operations may include, for example, code or instructions in a program. The hardware-implemented apparatus may include, but is not limited to, for example, a microprocessor, a central processing unit (CPU), graphics processing unit (GPU), a processor core, a multi-core processor, a multiprocessor, an application-specific integrated circuit (ASIC), a field-programmable gate array (FPGA), and a neural processing unit (NPU).

The processor 1210 may execute a program and control the automatic stock trading apparatus. A program code executed by the processor 1210 may be stored in the memory 1220.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of generating a texture image of a virtual fabric, the method comprising:
    generating, by a processor, similarity information associated with similarity between a portion of an input image with a pattern and a plurality of sub areas in the portion;
    automatically determining, by the processor, at least one of a number of times the pattern is repeated in the portion of the input image or a direction in which of the pattern is repeated in the portion of the input image, based on the similarity information; and
    generating a texture image of a virtual fabric by repeating the pattern in at least a predetermined area of the texture image based on at least one of the pattern, the number of times the pattern is repeated, or the direction in which the pattern is repeated.

2. The method of claim 1, wherein the portion of the input image is selected by a user.

3. The method of claim 2, wherein the portion of the input image has a size that is greater than a size of the area selected by the user input.

4. The method of claim 2, wherein the selected portion comprises the pattern.

5. The method of claim 2, wherein
    the input image comprises at least one of a color image or a normal image, and
    the similarity information is determined based on at least one of first similarity information indicative of similarity between the pattern and the plurality of sub areas in the color image, and second similarity information indicative of similarity between the pattern and the plurality of sub areas in the normal image.

6. The method of claim 5, wherein the similarity information is determined as a weighted sum of the first similarity information and the second similarity information.

7. The method of claim 1, further comprising correcting the texture image based on at least one of pattern correction information, overlapping area information and brightness correction information.

8. The method of claim 7, wherein the correcting of the texture image based on the pattern correction information comprises:
    applying a homography function on the texture image so that an angle between a first direction and a second direction becomes perpendicular;
    aligning a plurality of basic patterns disposed in the generated texture image based on the first direction and the second direction;
    correcting a first reference line to a straight line so that the first reference line becomes vertical relative to the second direction when the first reference line following the first direction is curved; and
    correcting a second reference line to a straight line so that the second reference line becomes vertical relative to the first direction when the second reference line following the second direction is curved.

9. The method of claim 8, wherein the correcting of the texture image based on the brightness correction information comprises correcting a brightness of the pattern that is repeated based on the brightness correction information to resolve inconsistency of a brightness between the plurality of basic patterns included in the texture image.

10. The method of claim 7, wherein the correcting of the texture image based on the overlapping area information comprises:
    dividing the texture image into a plurality of patches;
    rearranging the plurality of patches;
    determining presence of a discontinuous pattern area in an area where the plurality of rearranged patches contact each other;
    determining an overlapping area of the plurality of patches based on presence of the discontinuous pattern area; and
    overlapping the plurality of patches based on the overlapping area.

11. The method of claim 10, further comprising smoothing the plurality of patches using a multi-band blending scheme.

12. The method of claim 1, wherein the information about the repetition number comprises a number of sub areas that is similar to the pattern with a degree greater than or equal to predetermined criteria.

13. The method of claim 1, wherein the information about the repetition direction comprises direction-related information which is determined based on a distributed direction of sub areas similar to the pattern with a degree greater than or equal to predetermined criteria.

14. The method of claim 1, wherein the information about the repetition direction comprises a first direction in which sub areas similar to the pattern with a degree greater than or equal to predetermined criteria are distributed and a second direction in which sub areas similar to the pattern with a degree greater than or equal to predetermined criteria are distributed based on a location of the pattern.

15. The method of claim 1, wherein the generating of the texture image comprises:
determining a location of the pattern;
determining a first direction and a second direction based on the location of the pattern and the information about the repetition direction;
determining a first repetition number of a plurality of sub areas distributed in the first direction and a second repetition number of a plurality of sub areas distributed in the second direction based on the information about the repetition number and the information about the repetition direction; and
generating the texture image by arranging the pattern repeatedly based on the first direction, the second direction, the first repetition number, and the second repetition number.

16. The method of claim 1, wherein determining at least one of the number of times the pattern is repeated or the direction is repeated in the portion comprises:
removing noise by blurring the similarity information;
extracting an area having a similarity greater than or equal to a threshold value based on a blurred version of the similarity information;
converting similarity information of the extracted area greater than or equal to the threshold value using a frequency domain transform; and
obtaining at least one of the information about the repetition number and the information about the repetition direction based on the converted similarity information.

17. The method of claim 1, further comprising outputting a simulation result of clothing a three-dimensional (3D) avatar with a 3D garment incorporating the texture image.

18. The method of claim 1, further comprising:
receiving a user input related to controlling a size of the texture image; and
modifying the size of the texture image expressed on a 3D garment according to the user input for the texture image.

19. A non-transitory computer-readable storage medium storing instructions that, when executed by a processor, cause the processor to
generate similarity information associated with similarity between a portion of an input image with a pattern and a plurality of sub areas in the portion;
automatically determine at least one of a number of times the pattern is repeated in the portion of the input image or a direction in which of the pattern is repeated in the portion of the input image, based on the similarity information; and
generate a texture image of a virtual fabric by repeating the pattern in at least a predetermined area of the image based on at least one of the pattern, the number of times the pattern is repeated, and the direction in which the pattern is repeated.

20. An electronic device comprising:
a processor; and
memory storing instructions thereon, the instructions when executed by the processor cause the processor to:
generate similarity information associated with similarity between a portion of an input image with a pattern and a plurality of sub areas in the portion;
automatically determine at least one of a number of times the pattern is repeated in the portion of the input image or a direction in which of the pattern is repeated in the portion of the input image, based on the similarity information; and
generate a texture image of a virtual fabric by repeating the pattern in at least a predetermined area of the texture image based on at least one of the pattern, the number of times the pattern is repeated, and the direction in which the pattern is repeated.

\* \* \* \* \*